US008098888B1

(12) United States Patent
Mummareddy et al.

(10) Patent No.: US 8,098,888 B1
(45) Date of Patent: Jan. 17, 2012

(54) METHOD AND SYSTEM FOR AUTOMATIC ANALYSIS OF THE TRIP OF PEOPLE IN A RETAIL SPACE USING MULTIPLE CAMERAS

(75) Inventors: Satish Mummareddy, Washington, DC (US); Rajeev Sharma, State College, PA (US); Namsoon Jung, State College, PA (US)

(73) Assignee: VideoMining Corporation, State College, PA (US)

( * ) Notice: Subject to any disclaimer, the term of this patent is extended or adjusted under 35 U.S.C. 154(b) by 998 days.

(21) Appl. No.: 12/011,650

(22) Filed: Jan. 28, 2008

(51) Int. Cl.
*G06K 9/00* (2006.01)
(52) U.S. Cl. ........................................ 382/103
(58) Field of Classification Search .................. 382/103; 348/169
See application file for complete search history.

(56) References Cited

U.S. PATENT DOCUMENTS

| | | | |
|---|---|---|---|
| 6,061,088 A | 5/2000 | Khosravi et al. | |
| 6,263,088 B1 * | 7/2001 | Crabtree et al. | 382/103 |
| 6,272,250 B1 | 8/2001 | Sun et al. | |
| 6,394,557 B2 | 5/2002 | Bradski | |
| 6,404,900 B1 | 6/2002 | Qian et al. | |
| 6,661,918 B1 * | 12/2003 | Gordon et al. | 382/173 |
| 6,741,973 B1 | 5/2004 | Dove et al. | |
| 7,606,728 B2 * | 10/2009 | Sorensen | 705/7.29 |
| 7,778,863 B2 * | 8/2010 | Yoshida et al. | 705/7.31 |
| 7,930,204 B1 * | 4/2011 | Sharma et al. | 705/7.31 |
| 2002/0085092 A1 * | 7/2002 | Choi et al. | 348/77 |
| 2002/0178085 A1 * | 11/2002 | Sorensen | 705/26 |
| 2003/0002712 A1 | 1/2003 | Steenburgh et al. | |
| 2003/0053659 A1 * | 3/2003 | Pavlidis et al. | 382/103 |
| 2004/0111454 A1 * | 6/2004 | Sorensen | 708/200 |
| 2004/0113933 A1 * | 6/2004 | Guler | 345/716 |
| 2004/0120581 A1 * | 6/2004 | Ozer et al. | 382/224 |
| 2004/0131254 A1 * | 7/2004 | Liang et al. | 382/181 |
| 2005/0265582 A1 * | 12/2005 | Buehler et al. | 382/103 |
| 2006/0010028 A1 * | 1/2006 | Sorensen | 705/10 |
| 2006/0215880 A1 * | 9/2006 | Berthilsson et al. | 382/103 |
| 2006/0232583 A1 * | 10/2006 | Petrov et al. | 345/419 |
| 2007/0206844 A1 * | 9/2007 | Russakoff et al. | 382/132 |
| 2007/0226082 A1 * | 9/2007 | Leal | 705/27 |
| 2008/0027599 A1 * | 1/2008 | Logan et al. | 701/23 |

(Continued)

OTHER PUBLICATIONS

U.S. Appl. No. 60/874,585, Jung, et al.

(Continued)

*Primary Examiner* — Jason M Repko
*Assistant Examiner* — Shervin Nakhjavan

(57) ABSTRACT

The present invention is a method and system for automatically determining the trip of people in a physical space, such as retail space, by capturing a plurality of input images of the people by a plurality of means for capturing images, processing the plurality of input images in order to track the people in each field of view of the plurality of means for capturing images, mapping the trip on to the coordinates of the physical space, joining the plurality of tracks across the multiple fields of view of the plurality of means for capturing images, and finding information for the trip of the people based on the processed results from the plurality of tracks. The trip information can comprise coordinates of the people's position and temporal attributes, such as trip time and trip length, for the plurality of tracks. The physical space may be a retail space, and the people may be customers in the retail space. The trip information can provide key measurements along the entire shopping trip, from entrance to checkout, that deliver deeper insights about the trip as a whole.

24 Claims, 19 Drawing Sheets

U.S. PATENT DOCUMENTS

2008/0243614 A1* 10/2008 Tu et al. .......................... 705/14
2008/0292146 A1* 11/2008 Breed et al. ................... 382/118

OTHER PUBLICATIONS

G. R. Bradski, "Computer vision face tracking for use in a perceptual user interface," Intel Technology Journal, Q2, 1998.

F. Devernay, et al., "Straight lines have to be straight," Automatic calibration and removal of distortion from scenes of structured environments, Machine Vision and Applications 13(1) pp. 14-24, 2001.

N. Friedman, et al., "Image segmentation in video sequences: A probabilistic approach," in Thirteenth Conference on Uncertainty in Artificial Intelligence, 1997.

W. E. L. Grimson, et al., "Using adaptive tracking to classify and monitor activities in a site," in IEEE Conference on Computer Vision and Pattern Recognition, 1998.

M. Isard, et al., "Condensation—conditional density propagation for visual tracking," International Journal of Computer Vision 29(1), pp. 5-28, 1998.

F. Porikli, "Multi-camera surveillance: Object-based summarizatoin approach," MERL, Mar. 2004.

C. Stauffer, et al., "Adaptive background mixture models for real-time tracking," IEEE Computer Society Conference on Computer Vision and Pattern Recognition, vol. 2, 1999.

* cited by examiner

| 32 BIT WORD ||||
|---|---|---|---|
| CLUSTER 1 MIN THRESHOLD | CLUSTER 1 MAX THRESHOLD | CLUSTER 2 MIN THRESHOLD | CLUSTER 2 MAX THRESHOLD |
| 0 | 10 | 50 | 60 |

610

| TIME | CURRENT MODEL | LEARNING MODEL |
|---|---|---|
| 0 | NONE | A |
| 5 | A | B |
| 10 | B | C |
| 15 | C | D |

METHOD AND SYSTEM FOR AUTOMATIC ANALYSIS OF THE TRIP OF PEOPLE IN A RETAIL SPACE USING MULTIPLE CAMERAS

BACKGROUND OF THE INVENTION

1. Field of the Invention

The present invention is a method and system for automatically analyzing the trip of people in a physical space, such as a retail space, by capturing a plurality of input images of the people by a plurality of means for capturing images, tracking the people in each field of view of the plurality of means for capturing images, mapping the trip on to the coordinates of the physical space, joining the plurality of tracks across the multiple fields of view of the plurality of means for capturing images, and finding information for the trip of the people based on the processed results from the plurality of tracks.

2. Background of the Invention

Shoppers' Behavior Analysis

There have been earlier attempts for understanding customers' shopping behaviors captured in a video in a targeted environment, such as in a retail store, using cameras.

U.S. Pat. Appl. Pub. No. 2006/0010028 of Sorensen (hereinafter Sorensen 2006/0010028) disclosed a method for tracking shopper movements and behavior in a shopping environment using a video. In Sorensen 2006/0010028, a user indicated a series of screen locations in a display at which the shopper appeared in the video, and the series of screen locations were translated to store map coordinates. The step of receiving the user input via input devices, such as a pointing device or keyboard, makes Sorensen 2006/0010028 inefficient for handling a large amount of video data in a large shopping environment with a relatively complicated store layout, especially over a long period of time. The manual input by a human operator/user cannot efficiently track all of the shoppers in such cases, not to mention the possibility of human errors due to tiredness and boredom. Also, the manual input approach is not scalable according to the number of shopping environments to handle.

Although U.S. Pat. Appl. Pub. No. 2002/0178085 of Sorensen (hereinafter Sorensen 2002/0178085) disclosed the usage of a tracking device and store sensors in a plurality of tracking systems primarily based on the wireless technology, such as the RFID, Sorensen 2002/0178085 is clearly foreign to the concept of applying computer vision-based tracking algorithms to the field of understanding customers' shopping behaviors and movements.

In Sorensen 2002/0178085, each transmitter was typically attached to a handheld or push-type cart. Therefore, Sorensen 2002/0178085 cannot distinguish multiple shoppers' behaviors using one cart from the behavior of a single shopper also using one cart. Although Sorensen 2002/0178085 disclosed that the transmitter may be attached directly to a shopper via a clip or other form of customer surrogate in order to help in the case where the customer is shopping without a cart, this will not be practical due to the additionally introduced cumbersome step to the shopper, not to mention the inefficiency of managing the transmitter for each individual shopper.

U.S. Pat. No. 6,741,973 of Dove, et al. (hereinafter Dove) disclosed a model of generating customer behavior in a transaction environment. Although Dove disclosed video cameras in a real bank branch as a way to observe the human behavior, Dove is clearly foreign to the concept of automatic and real-time analysis of the customers' behaviors based on visual information of the customers in a retail environment, such as shopping path tracking and analysis.

U.S. Pat. Appl. Pub. No. 2003/0053659 of Pavlidis, et al. (hereinafter Pavlidis) disclosed a method for moving object assessment, including an object path of one or more moving objects in a search area, using a plurality of imaging devices and segmentation by background subtraction. In Pavlidis, the object included customers. Pavlidis was primarily related to monitoring a search area for surveillance.

U.S. Pat. Appl. Pub. No. 2004/0120581 of Ozer, et al. (hereinafter Ozer) disclosed a method for identifying the activity of customers for marketing purposes or the activity of objects in a surveillance area, by comparing the detected objects with the graphs from a database. Ozer tracked the movement of different object parts and combined them to high-level activity semantics, using several Hidden Markov Models (HMMs) and a distance classifier. U.S. Pat. Appl. Pub. No. 2004/0131254 of Liang, et al. (hereinafter Liang) also disclosed the Hidden Markov Models (HMMs) as a way, along with the rule-based label analysis and the token parsing procedure, to characterize behavior in their disclosure. Liang disclosed a method for monitoring and classifying actions of various objects in a video, using background subtraction for object detection and tracking. Liang is particularly related to animal behavior in a lab for testing drugs. Neither Ozer or Liang disclosed a method or system for tracking people in a physical space using multiple cameras.

Activity Analysis in Various Other Areas, Such as Surveillance Application

There have been earlier attempts for activity analysis in various other areas than understanding customers' shopping behavior, such as the surveillance and security applications.

The following prior arts are not restricted to the application area for understanding customers' shopping behaviors in a targeted environment, but they disclosed methods for object activity modeling and analysis for a human body, using a video, in general.

U.S. Pat. Appl. Pub. No. 2002/0085092 of Choi, et al. (hereinafter Choi) disclosed a method for modeling an activity of a human body using the optical flow vector from a video and probability distribution of the feature vectors from the optical flow vector. Choi modeled a plurality of states using the probability distribution of the feature vectors and expressed the activity based on the state transition.

U.S. Pat. Appl. Pub. No. 2004/0113933 of Guler disclosed a method for automatic detection of split and merge events from video streams in a surveillance environment. Guler considered split and merge behaviors as key common simple behavior components in order to analyze high-level activities of interest for surveillance application: which are also used to understand the relationships among multiple objects, not just individual behavior. Guler used adaptive background subtraction to detect the objects in a video scene, and the objects were tracked to identify the split and merge behaviors. To understand the split and merge behavior-based, high-level events, Guler used a Hidden Markov Model (HMM).

The prior arts lack the features for automatically analyzing the trips of people in a physical space, by capturing multiple input images of the people by multiple means for capturing images and tracking the people in each field of view of the means for capturing images, while joining the track segments across the multiple fields of views and mapping the trips on to the coordinates of the physical space. Essentially, the prior arts lack the features for finding the information of the trips of the people based on the automatically processed results from the plurality of tracks using computer vision algorithms. Therefore, a novel usage of computer vision technologies for understanding the shoppers' trips in a more efficient manner in a physical space, such as a retail environment, is needed.

Tracking Using Multiple Cameras:

There have been earlier attempts to detect and track a human body part in a physical space. Background subtraction is one of the exemplary methods to detect the tracked object in the video. There have also been earlier attempts for multiple people tracking in a video.

However, the prior art video tracking systems heretofore known lack many of the functional performance and robustness capabilities that are needed for understanding the shoppers' trip information in a retail environment as it will be discussed later. Therefore, there is still need for a novel usage of computer vision technologies for understanding the shoppers' trips in a more efficient manner in a physical space.

U.S. Pat. No. 6,061,088 of Khosravi, et al. (hereinafter Khosravi) disclosed a multi-resolution adaptation system. The primary difference between Khosravi and the present invention is that the present invention sub-samples the image initially, whereas Khosravi breaks down a full frame image into smaller regions, and makes a decision for each region. For the present invention, a region is simply 1 pixel.

U.S. Pat. No. 6,263,088 of Crabtree, et al. (hereinafter Crabtree U.S. Pat. No. 6,263,088) is based on a single camera and designed to track people in a space seen from above. Although, the camera calibration data section in Crabtree U.S. Pat. No. 6,263,088 has a similarity with that of the present invention, the primary difference should be pointed out that, as input, Crabtree U.S. Pat. No. 6,263,088 accepted the information regarding the statistical range of the persons' width/heights.

U.S. Pat. No. 6,272,250 of Sun, et al. (hereinafter Sun) disclosed a method for clustering pixel data into groups of data of similar color. Sun is based on a single camera or video and requires an elaborate color clustering approach, making their method computationally expensive and not suitable for tracking general targets in 3D. Sun also disclosed the clustering of the intensity values, and the use of a "vigilance value" to control the effective cluster size. However, importantly, in order to overcome the computational cost in Sun, the present invention differs in that the present invention is using grayscale instead of RGB or YUV.

The method of U.S. Pat. No. 6,394,557 of Bradski is based on using color information to track the head or hand of a person in the view of a single camera. It is well known that the use of only color information in general is insufficient to track small, fast moving objects in a cluttered environment. The method in Bradski is hence much less general and only workable in certain specialized environments.

The method of U.S. Pat. No. 6,404,900 of Qian, et al. (hereinafter Qian) is designed to track human faces in the presence of multiple people. The method is highly specialized to head tracking, making it unsuitable for alternative application domains and targets.

U.S. Pat. Appl. Pub. No. 2005/0265582 of Buehler, et al. (hereinafter Buehler) disclosed a video surveillance system that is capable of tracking multiple objects and monitoring the behavior of the objects. Buehler constructed a track graph, which represented the movement of blobs, based on the observations of the blobs from multiple image sensors for a long period of time, and then Buehler solved the track graph to correspond the blobs to specific objects in the monitored environment.

Although Buehler very briefly suggested "background subtraction" as one of the techniques to separate a foreground object, such as the blob, from the static background, Buehler lacks the details of how to apply the "background subtraction" algorithm in the computer vision research to the foreground detection.

The prior arts above are not intended for understanding the customers' trip information and their shopping behaviors by tracking and analyzing the movement information of the customers in a targeted environment, such as in a retail store. Therefore, the present invention discloses a novel approach of using computer vision technologies for understanding customers' shopping behaviors by tracking and analyzing the movement information of the customers' trips in a targeted environment.

SUMMARY

The present invention is a method and system for automatically determining the trips of people in a physical space, by capturing a plurality of input images of the people by a plurality of means for capturing images.

The present invention processes the plurality of input images in order to track the people in each field of view of the plurality of means for capturing images.

The present invention efficiently handles the joining of the plurality of tracks across the multiple fields of view of the plurality of means for capturing images, accounting for splits and merges, maps the trips on to the coordinates of the physical space, and finds the information for the trips of the people based on the processed results from the plurality of tracks.

In the present invention, the "trip" is defined as a person's movement across multiple fields of view of multiple means for capturing images, such as cameras, from entrance to exit, such as exit through a checkout, in a physical space. In the embodiment of the present invention, the trip information can comprise coordinates of the person's position and temporal attributes, such as trip time and trip length, for the plurality of trips.

Although the application area of the present invention is not limited to any particular application domain, the physical space where the embodiment of the present invention can be deployed may be a retail space, and the person may be a customer in the retail space.

In such case, it is an objective of the present invention to provide key measurements along the entire shopping trip, from entrance to checkout, that deliver deeper insights about the trip as a whole, based on the automatically and efficiently measured trip information.

DRAWINGS

Figures

FIG. 12 shows exemplary minimum and maximum thresholds for the intensity histogram in the two-cluster model and an exemplary table for cycling background models in the exemplary embodiment of the present invention.

DETAILED DESCRIPTION OF THE INVENTION

Figure 1:
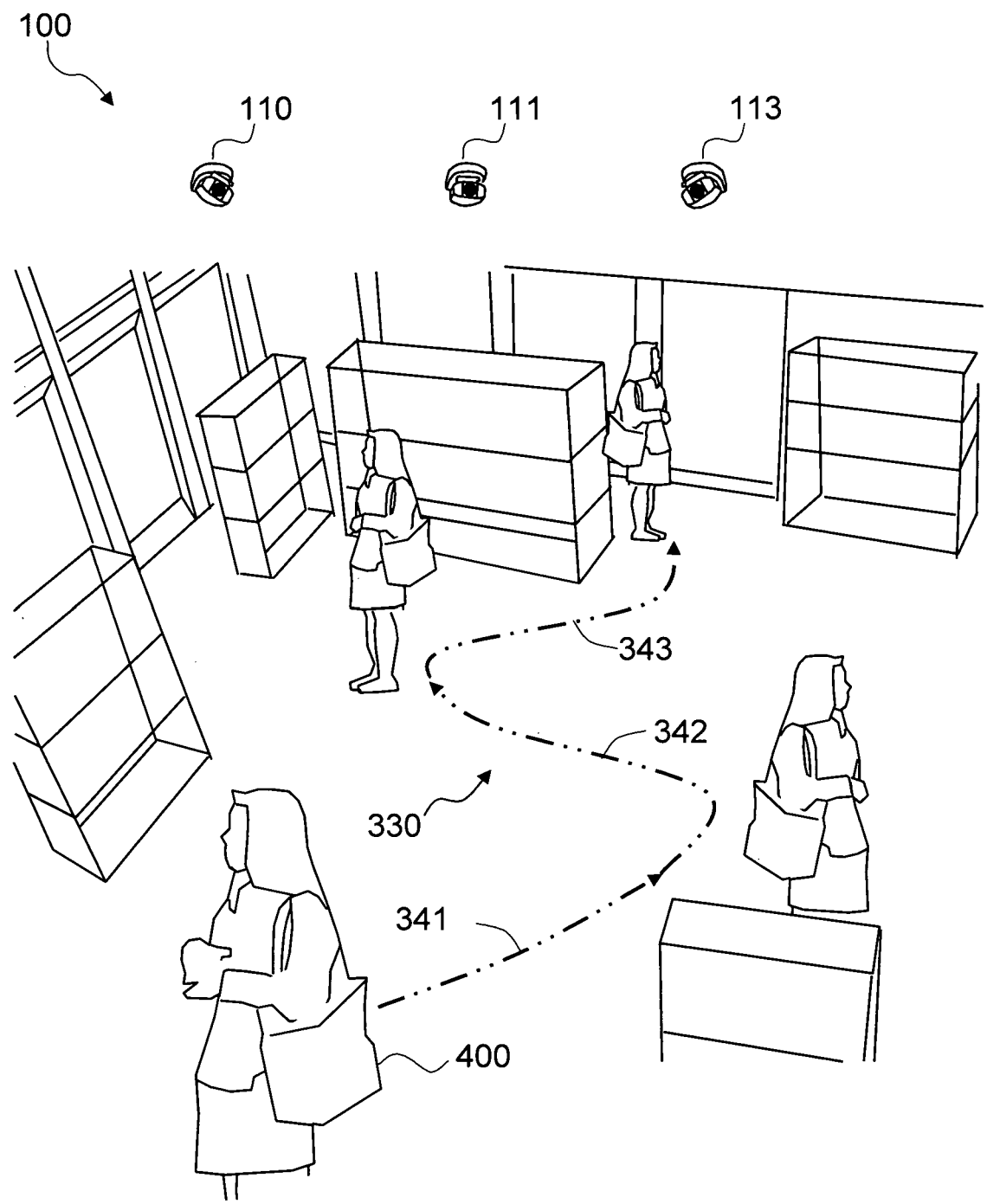
FIG. 1 is an overview of a preferred embodiment of the invention, where the present invention measures the trip information of a person through the path the person took in a physical space.

FIG. 1 shows an overview of an exemplary embodiment of the invention. In the exemplary embodiment, the present invention measures the trip information of a person 400 through the path 330 the person 400 took in a physical space. In an exemplary embodiment shown in FIG. 1, the present invention first captures a plurality of input images of the person 400 in a physical space, such as a store, through a plurality of means for capturing images 100, such as "means for capturing images 1" 110, "means for capturing images 2" 111, and "means for capturing images N" 113. The present invention joins the trajectories of the person tracks, such as "track 1" 341, "track 2" 342, and "track N" 343, from a video of a means for capturing images 100 to another video of a means for capturing images 100 while the person 400 appears and disappears between the fields of view among a plurality of means for capturing images 100. Based on the tracking information, the present invention processes said plurality of input images in order to analyze the trip information of the person 400.

Although the primary objective of the present invention is to automatically measure the trip of a person in any physical space, the present invention can be efficiently applied to automatically measure the shopping path of a person during a visit to a retail store.

The following exemplary behavioral attributes that can be elements of the trip information are explained in the context of the shopping path measurement in a retail store application.

Sequence

The sequencing pattern can be one of the behavioral attributes that the trip information can comprise. With regard to this data, the trip information can comprise what areas of the store a person has shopped most recently, the areas the person is most likely to shop next, or some relevant combination of previously shopped areas. This sequencing can be used to provide information for a product that has already been viewed or reference a product that is likely to be viewed in the near future, based on the person's behavior—thus improving the probability of purchase for the product in a retail store.

Direction of Travel

In addition to sequence, direction of travel past a particular display can be used as the basis of a predicted shopping pattern of a person.

Frequency

The behavioral analysis can also comprise information for multiple visits to a specific area in the physical space by the same person. This frequency pattern might trigger a series of related but progressively engaging or informing market activities. For example, the frequency in the trip information can steadily build awareness of a given product and increase the probability of purchase for a particular product.

Temporal Measures, Such as Dwell Time

In-store activities can be tailored based on the length of time a person spends in a given area. The present invention can define a plurality of areas that are targeted for market research in a physical space. Using this data, a market research and retail store plan can be correlated to the perceived activity of the person, based on the person's dwell time in a particular area.

With regard to the temporal behavior of customers, U.S. Pat. Appl. Pub. No. 2003/0002712 of Steenburgh, et al. (hereinafter Steenburgh) disclosed a relevant prior art. Steenburgh disclosed a method for measuring dwell time of an object, particularly a customer in a retail store, which enters and exits an environment, by tracking the object and matching the entry signature of the object to the exit signature of the object, in order to find out how long people spend in retail stores.

The present invention can utilize a similar approach as in Steenburgh for an exemplary embodiment to measure the dwell time. However, the temporal measure in the present invention is not limited to the dwell time just for the object entering and exiting an environment. As said above, the present invention measures the length of time a person spends in a given area in a physical space, and a plurality of areas can be used for the temporal measurement for the market research goals in the physical space. Therefore, in the present invention, a set of dwell times for multiple segments in a joined track can be measured.

Figure 2:
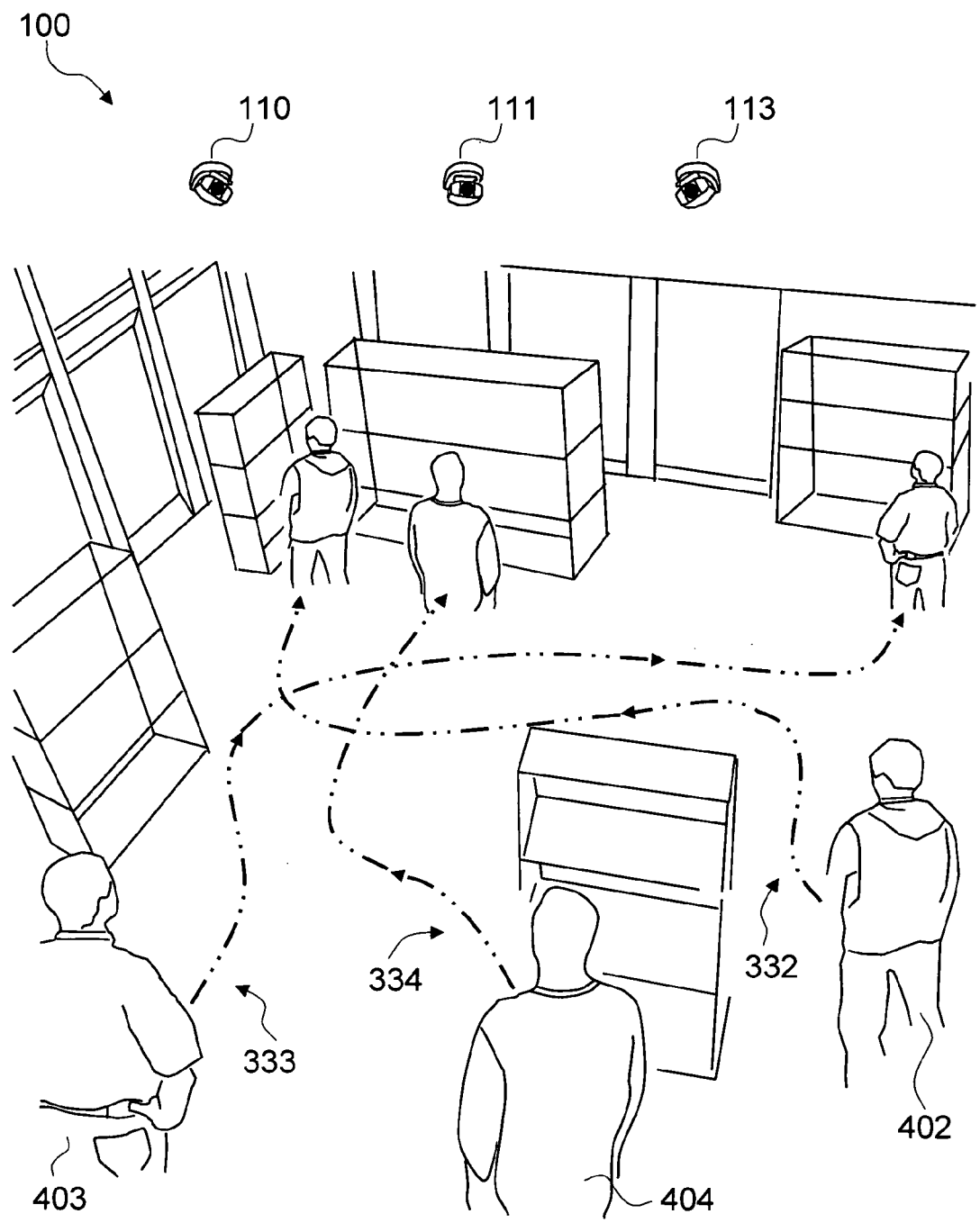
FIG. 2 is an overview of another preferred embodiment of the invention, where the present invention measures the trip information of a group of persons through the paths the group of persons took in a physical space.

FIG. 2 shows an overview of another preferred embodiment of the invention, where the present invention measures the trip information of a group of persons through the paths the group of persons took in a physical space. In the present invention, the process for analyzing and extracting the trip information can be performed either at an individual person 400 level or at a group of persons level.

In an exemplary embodiment, the present invention repeats the person tracking for each person 400 that appears in the field of view of a plurality of means for capturing images 100. When the present invention detects a group of persons is approaching to a predefined area, the present invention can analyze the group behavior by the aggregated behavior analyses from the individual person tracking information.

For example, in the exemplary embodiment shown in FIG. 2, the present invention first captures a plurality of input images of the group of persons and their paths, such as path A 332, path B 333, and path C 334 for person A 402, person B 403, and person C 404, respectively, based on the individual tracking information in a store through a plurality of means for capturing images 100. Then, the present invention processes said plurality of input images in order to analyze the trip information of the group of persons.

The group behavior analysis can be decided by a set of predefined rules, such as a majority rule, in which the major characteristics among the aggregated individual behavior analyses represent the entire group behavior.

The present invention can also utilize more sophisticated rule application approaches than the simple rule application. For example, in the exemplary embodiment, the present invention can utilize a rule application module for processing the group behavior analysis.

The logic module enables dynamic rule application, where the group behavior analysis can be adjusted in a much easier and more structured way whenever there is a need for changes in the rules, which represent the group behavior analysis criteria, defined in the module, rather than relying on an ad hoc solution or static hard codes. An exemplary rule application module can be implemented utilizing the information unit verification technologies in U.S. Provisional Pat. No. 60/874,585 of Jung, et al. (hereinafter Jung 60/874,585).

Figure 3:
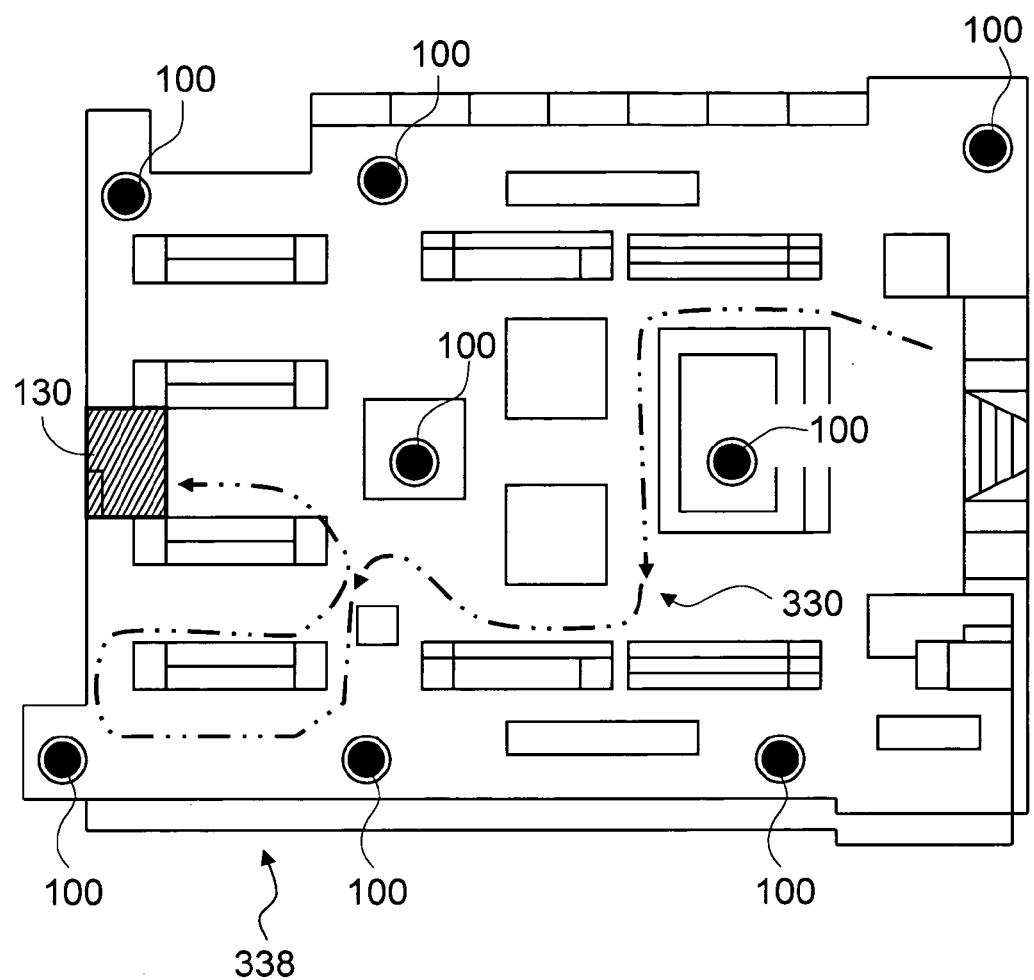
FIG. 3 shows an exemplary trip measurement for a specific section of a physical space, where a person in the physical space is tracked through arrays of means for capturing images in an exemplary embodiment of the present invention.
Figure 4:
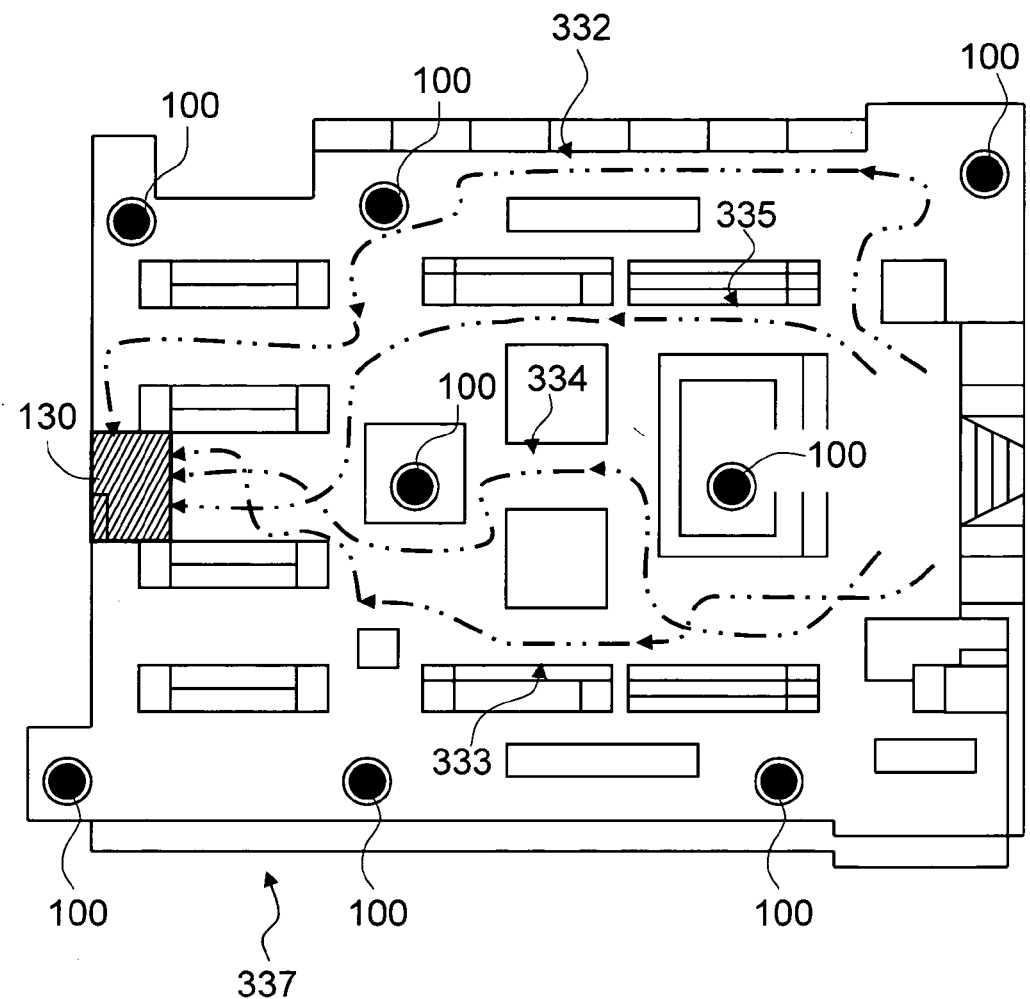
FIG. 4 shows an exemplary trip measurement in a physical space, where each person of a plurality of persons in the physical space is tracked through arrays of means for capturing images in an exemplary embodiment of the present invention.

FIG. 3 shows an exemplary trip measurement for a specific section of a physical space, where a person in the physical space is tracked through arrays of means for capturing images 100 in an exemplary embodiment of the present invention. FIG. 4 shows an exemplary trip measurement in a physical space, where each person of a plurality of persons in the physical space is tracked through arrays of means for capturing images in an exemplary embodiment of the present invention.

As shown in FIG. 3 and FIG. 4, in the exemplary embodiment of the present invention, the plurality of means for capturing images 100 can be installed separately from a target object 130 in the physical space, such as the means for displaying output, a category, or a predefined area. This capability for the separation of the device locations makes the layout of equipment installation flexible. The present invention can also associate the sequence of the path 330 with the person 400 input and response, whereby the association provides valuable marketing data to the owner of the system.

Figure 5:
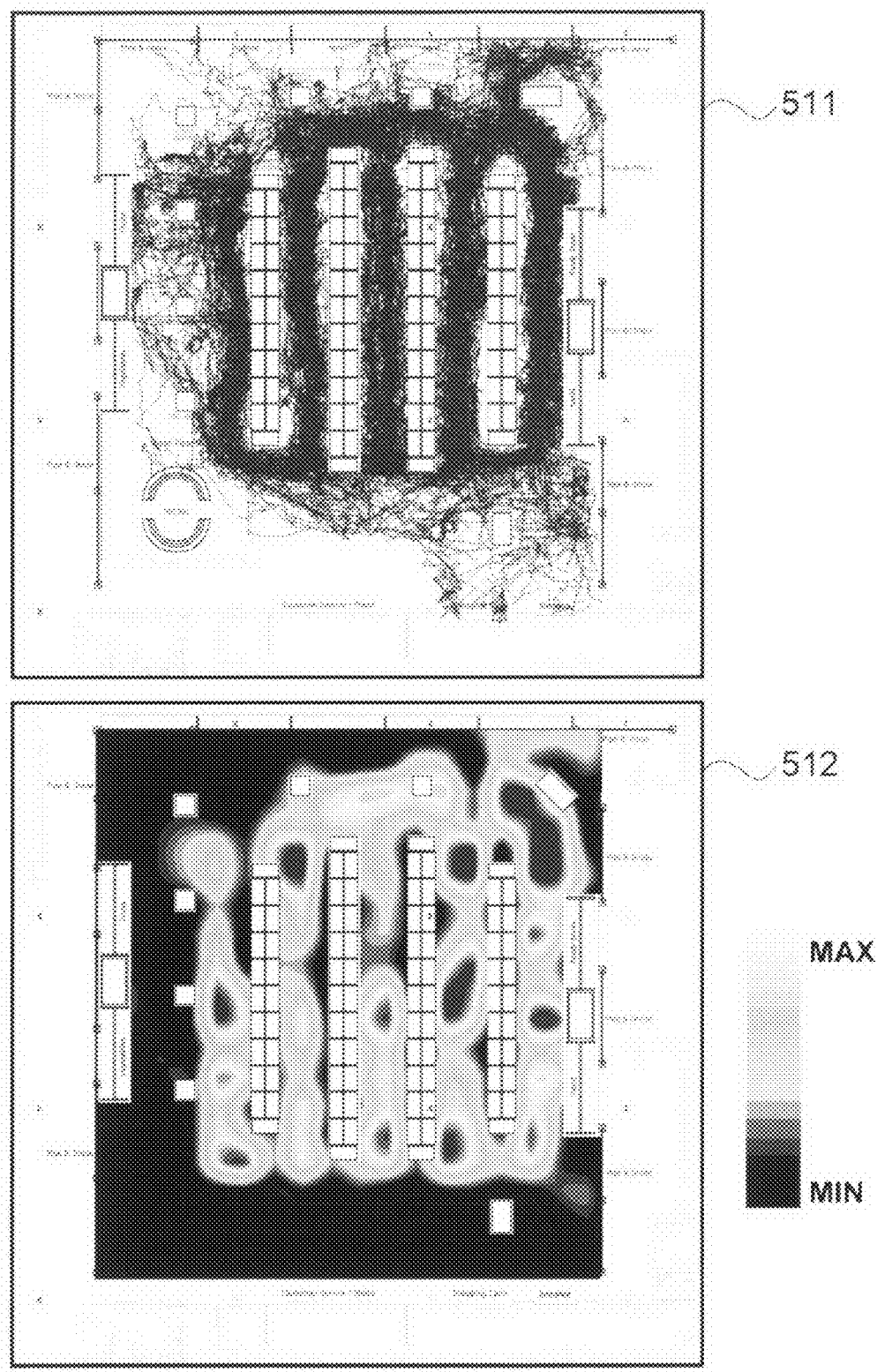
FIG. 5 shows exemplary analytic and statistical data from said trip information.

FIG. 5 shows exemplary analytic and statistical data from the trip information, such as an exemplary "traffic distribution map" 511 and an exemplary "shopping distribution map" 512.

The "traffic distribution map" 511 shows the accumulation of trips over a predefined time. The "shopping distribution map" 512 shows the spatial differences in volume of shopping. The maps can be created with different densities or scales to look at the data in different sections of a predefined object, such as a category or department, in a physical space. In the exemplary "traffic distribution map" 511, the areas with more dense trip lines show higher traffic than the less dense areas. In the exemplary "shopping distribution map" 512, the lighter areas are the areas of maximum activity, while the darker areas are the minimum. The maps allow the decision maker of the physical space to have an intuitive understanding of the traffic and shopping activity of people in the physical space, which further helps the decision maker to analyze the data with a better understanding. The statistical data associated with the traffic patterns and shopping activities, visualized by the maps, can be efficiently utilized for planning the physical space layout to better achieve business goals in the establishment.

Similarly, the present invention can generate various types of analytical and statistical data, which comprise:

a) a traffic distribution map that shows penetration throughout a store, b) a shopping distribution map that shows activity throughout a store, c) a shopping conversion map that shows traffic converted to shopping, d) a category-level traffic distribution map, e) a category-level shopping distribution map, f) a category-level shopping conversion map, g) a shopping sequence analysis that shows the order of categories shopped, and h) a category-level path analysis.

Figure 6:
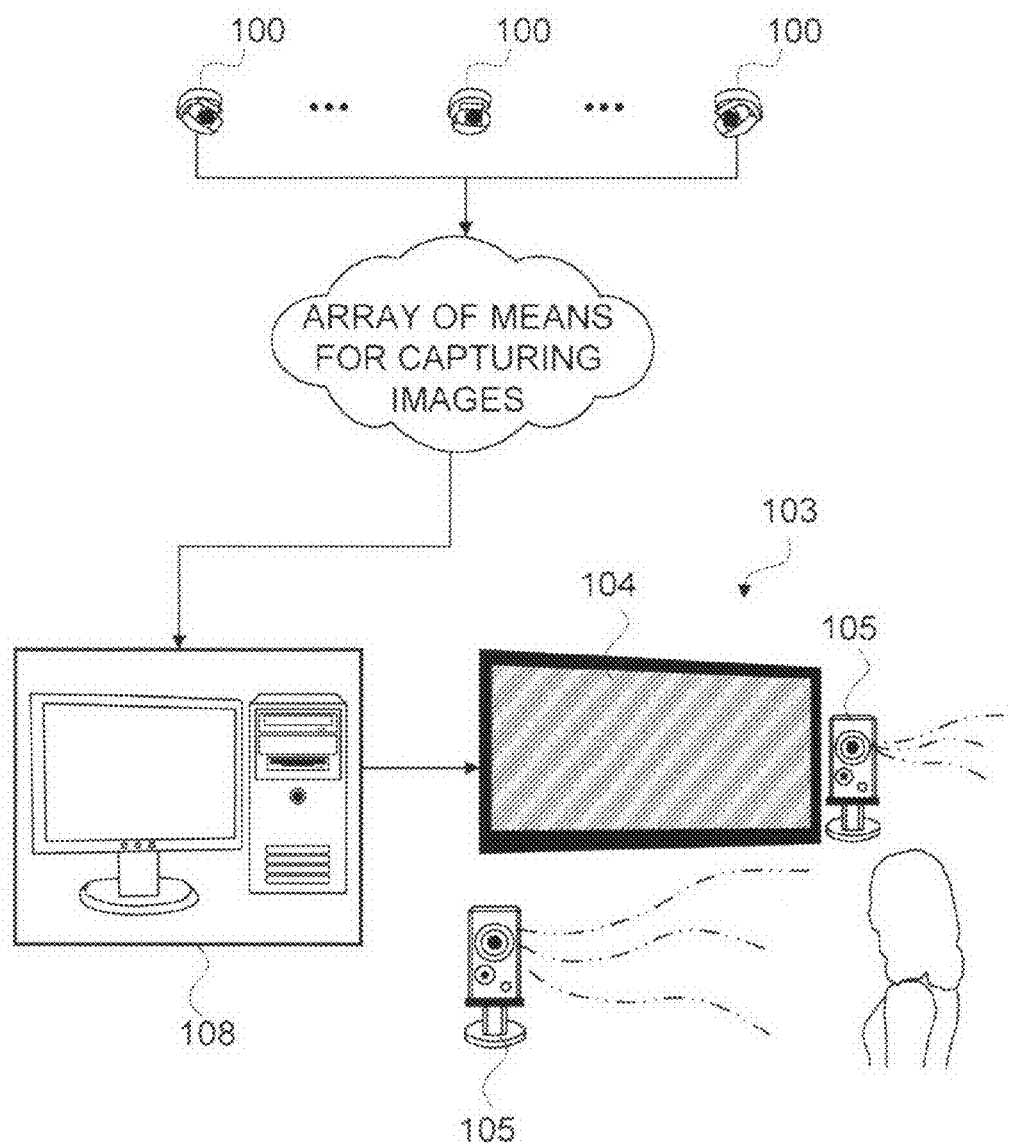
FIG. 6 shows an exemplary hardware configuration in a preferred embodiment of the invention.

FIG. 6 shows an exemplary hardware configuration in a preferred embodiment of the invention. In the exemplary embodiment shown in FIG. 6, the hardware embodiment and the software embodiment can be constructed as follows.

Exemplary Hardware Embodiment of the Present Invention

The exemplary hardware embodiment for the present invention can consist of a plurality of means for capturing images 100 of various focal lengths and CCD sizes. In the exemplary embodiment, the exemplary means for capturing images 100 can comprise a camera. The plurality of means for capturing images 100 can be powered via 18-gauge power cable connected to a standard power supply box, and connected to a means for control and processing 108 via RG59 coaxial cable. The means for control and processing 108 can be an Intel P4 2.4 Ghz PC machine with 512 MB SDRAM memory, with an 80 GB hard disk. An iTuner Spectra framegrabber card can be installed in the PCI slot, and hooked up to the RG59 coaxial cables coming from each of the plurality of means for capturing images 100. The output of the processed information in the means for control and processing 108 can be sent to a means for playing output 103, which can comprise means for displaying output 104 and means for playing audio output 105, such as a speaker system, for narrowcasting.

Exemplary Software Embodiment of the Present Invention

The exemplary software embodiment of the present invention can consist of three main software packages:

Vision Application The vision application performs all of the low-level vision algorithms on each video stream. The individual track outputs from each video stream are generated by this application on each of the available plurality of means for control and processing 108.

Remote Server: This application resides on each of the remote plurality of means for control and processing 108 that are connected to a plurality of means for capturing images 100 in a physical space. The remote server is responsible for controlling and monitoring the vision application, and communicating with other remote servers and the main server.

Main Server: The main server is responsible for coordinating the actions of all of the remote servers at a particular site.

The main server will send the relevant instructions to each of the remote servers, instruct them to begin processing, and receive all of their data. The joining of tracks and the final level of output are produced at the main server.

Figure 7:
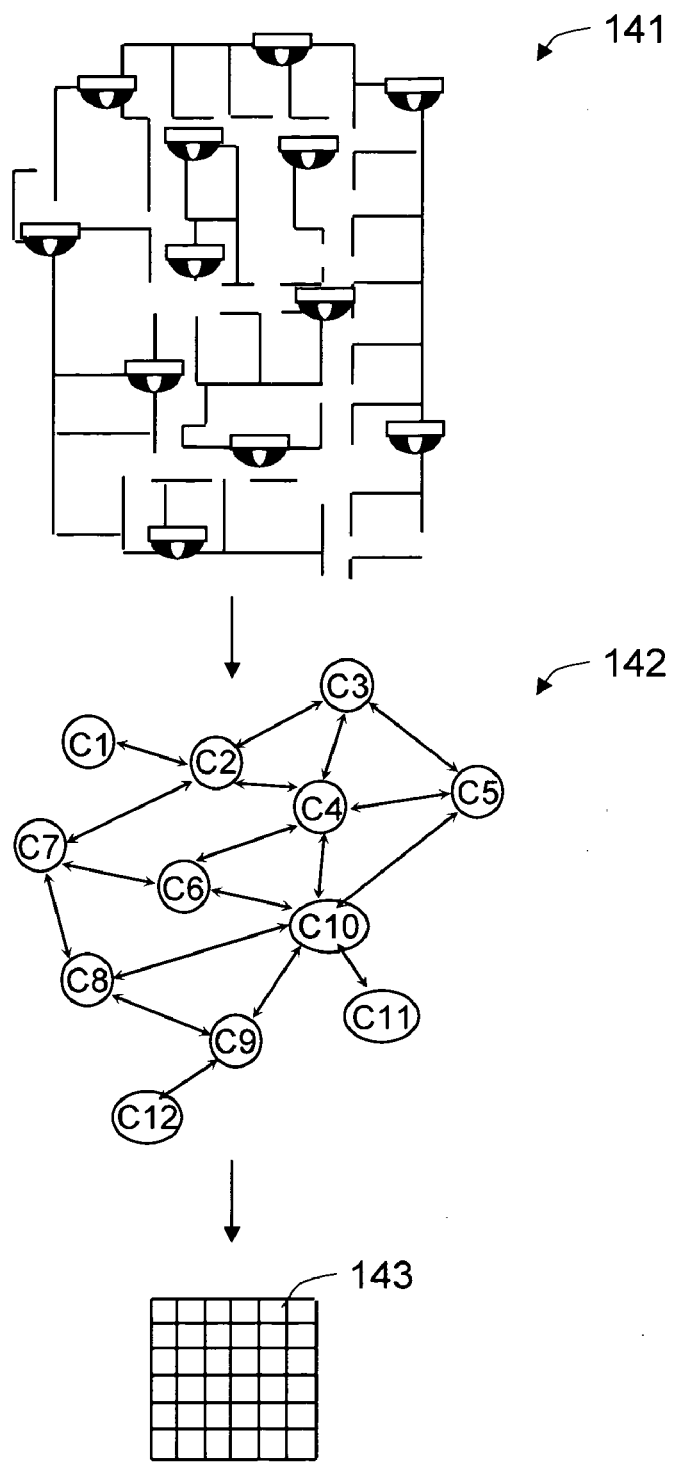
FIG. 7 shows an exemplary network of a plurality of means for capturing images and correspondences between tracks across the plurality of means for capturing images in a preferred embodiment of the invention.

FIG. 7 shows an exemplary "network of a plurality of means for capturing images" 141 and correspondences between tracks across the plurality of means for capturing images 100 in a preferred embodiment of the invention. FIG. 7 also shows the Bayesian Belief Network for the "network of a plurality of means for capturing images" 141. Each means for capturing images 100 corresponds to a node in the directed graph 142. The links show the possible physical routes between the multiple means for capturing images 100.

As illustrated in FIG. 7, the "network of a plurality of means for capturing images" 141 can be modeled as a Bayesian Belief Network, which is a graphical representation of a join probability distribution over a set of random variables. The Bayesian Belief Network is a directed graph in which each set of random variables is represented by a node, and directed edges between nodes represent conditional dependencies. The dependencies can represent the casual inferences among variables. The transition probabilities, corresponding to the likelihood of a person moving from one camera to another linked camera, are learned by observing the system. Note that each direction on a link may have a different probability. However, the total incoming and outgoing probability values are equal to one. This results in a transition probability "matrix for a plurality of means for capturing images" 143. This method will provide a scalable tracking system with a plurality of means for capturing images 100, such as a multi-camera tracking system, which handles the uncertainty in associating people across a plurality of means for capturing images 100.

Figure 8:
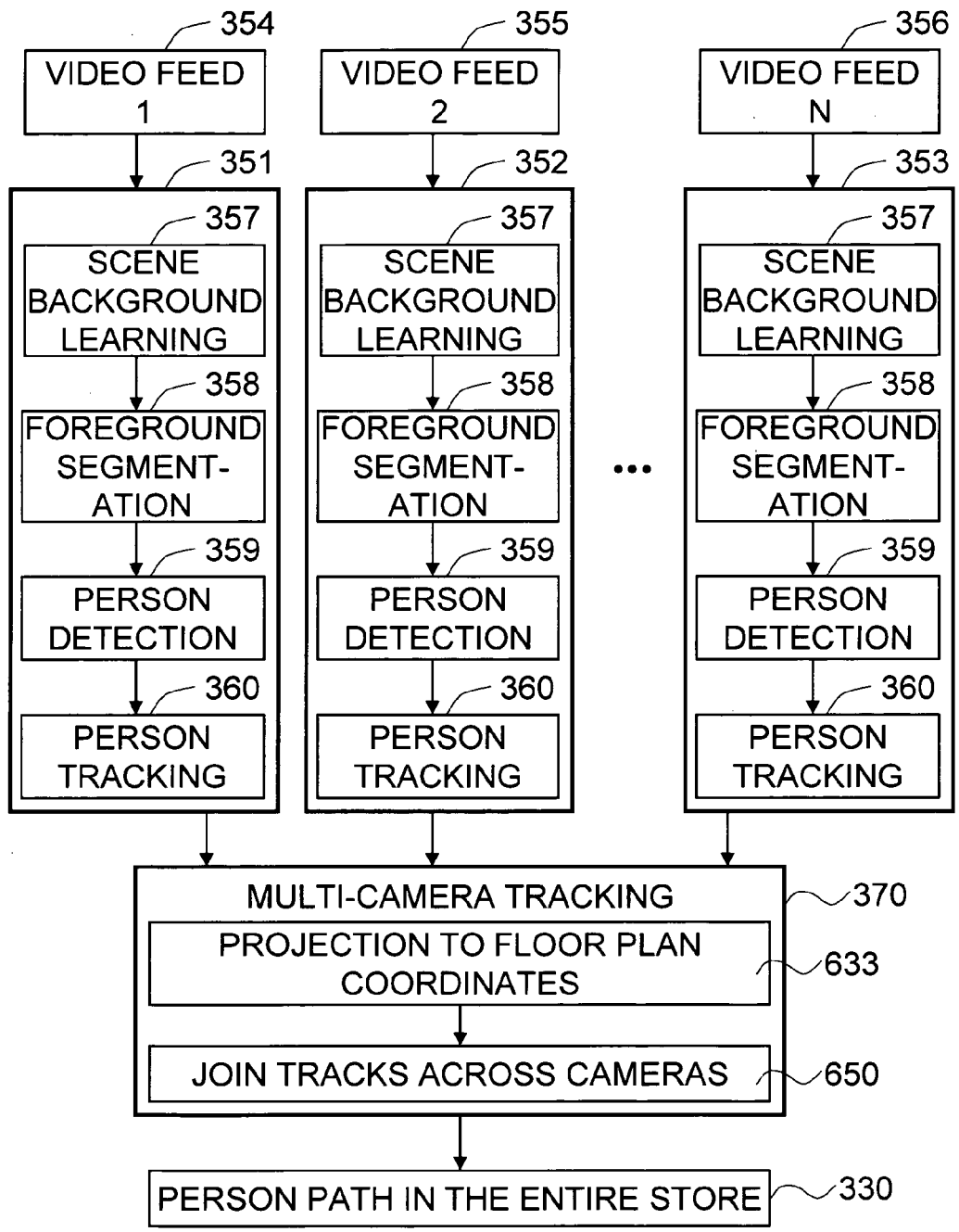
FIG. 8 shows an exemplary process of tracking and trip information measurement for a single person or a group of persons using multiple means for capturing images in a preferred embodiment of the invention.

FIG. 8 shows an exemplary process of tracking and trip information measurement for a single person 400 or a group of persons using multiple means for capturing images 100 in a preferred embodiment of the invention.

Person Detection

Person detection in a scene involves temporal segmentation of foreground objects from the scene and then identifying person objects inside the foreground regions, where an intuitive representation of the store itself is considered background and everything else foreground. A plurality of streams of video frames are processed, "video feed 1" 354, "video feed 2" 355, and "video feed N" 356 as shown in FIG. 8, and each pixel within the video frame is analyzed based on its temporal motion information. Each pixel is then modeled as a series of Gaussian distributions with a mean and a standard deviation at the scene background learning 357 process. This approach is shown in the following prior art works: W. E. L. Grimson, et al., "Using Adaptive Tracking to Classify and Monitor Activities in a Site," in IEEE Conference on Computer Vision and Pattern Recognition, 1998; C. Stauffer, et al., (hereinafter Stauffer), "Adaptive Background Mixture Models for Real-Time Tracking," CVPR, p. 2246, 1999 IEEE Computer Society Conference on Computer Vision and Pattern Recognition (CVPR'99)—Volume 2, 1999; and N. Friedman, "S.R. Image Segmentation in Video Sequences: A Probabilistic Approach," in Thirteenth Conf. on Uncertainty in Artificial Intelligence, 1997.

Pixel values falling near one of the Gaussian means are statistically likely to be background pixels, while the remaining pixels will be classified as foreground.

After a background model has been created for each pixel through the scene background learning 357, foreground segmentation 358 can be performed on future frames. Further processing is performed on the foreground segmentation 358 images in order to detect 359 and track 360 people. Further details of the single camera tracking, such as the "single camera person tracking 1" 351, "single camera person tracking 2" 352, and "single camera person tracking N" 353, will be discussed later with regard to FIG. 10 through FIG. 15.

The possibility for erroneous foreground pixels exists due to changes in lighting or the environment. Thus, not every group of foreground pixels may belong to an actual person. To handle this problem, a template-based approach is used in the exemplary embodiment of the present invention.

Figure 9:
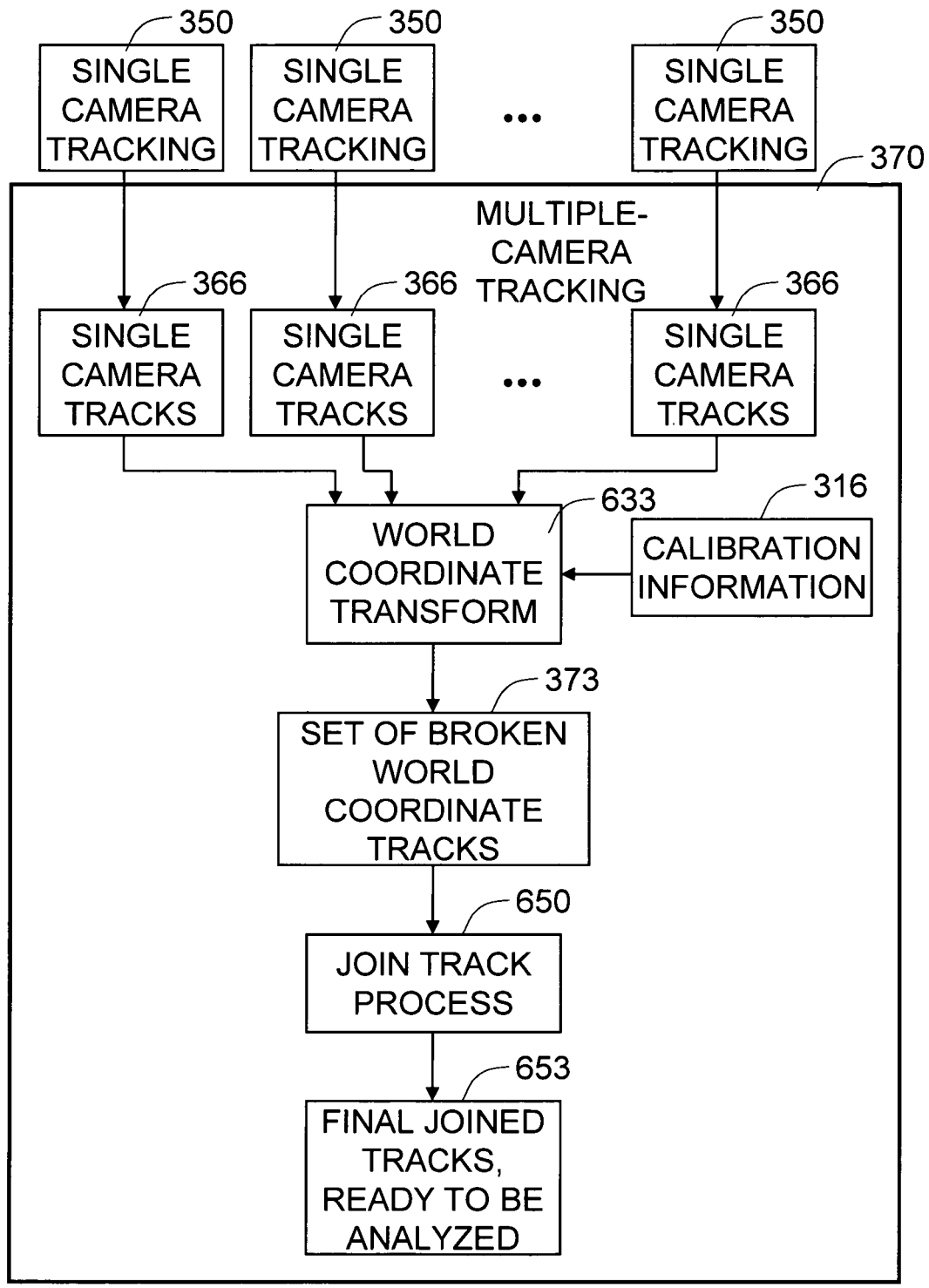
FIG. 9 shows an exemplary process of tracking using multiple means for capturing images and an exemplary join process for the multiple tracks in a preferred embodiment of the invention.

The multi-camera tracking 370 steps are further explained with regard to the following figure FIG. 9.

FIG. 9 shows an exemplary process of tracking using multiple means for capturing images 100 and an exemplary join process for the multiple tracks in a preferred embodiment of the invention. Details of the key steps in the multi-camera tracking 370 are explained from FIG. 10 to FIG. 19.

After the single camera tracking 350 step, the present invention aggregates and transforms 633 the series of coordinates in the field of view of the means for capturing images in each tracking to the world coordinates, which eventually creates a set of broken world coordinate tracks 373. The join track process 650 joins the set of broken world coordinate tracks 373, and the final joined tracks are ready to be analyzed 653 for shopper behavior in a physical space.

Figure 10:
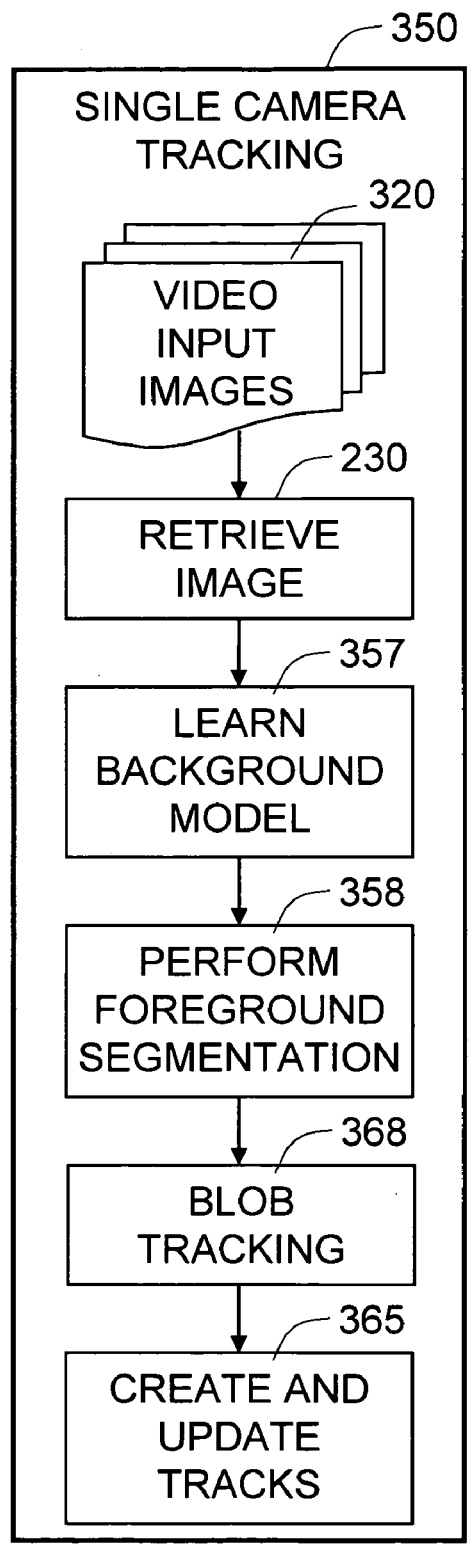
FIG. 10 shows an exemplary embodiment of the single camera tracking in the present invention.

FIG. 10 shows an exemplary embodiment of the single camera tracking 350 step in the present invention. In this particular exemplary embodiment, a single camera can be used as an exemplary means for capturing images. When the video input images are retrieved 230 from the camera, the single camera tracking module 350 in the present invention learns the background model 357 and performs the foreground segmentation 358. Then the present invention creates and updates the tracks 365 based on the blob tracking 368 on the background model 357 and the foreground segmentation 358.

Figure 11:
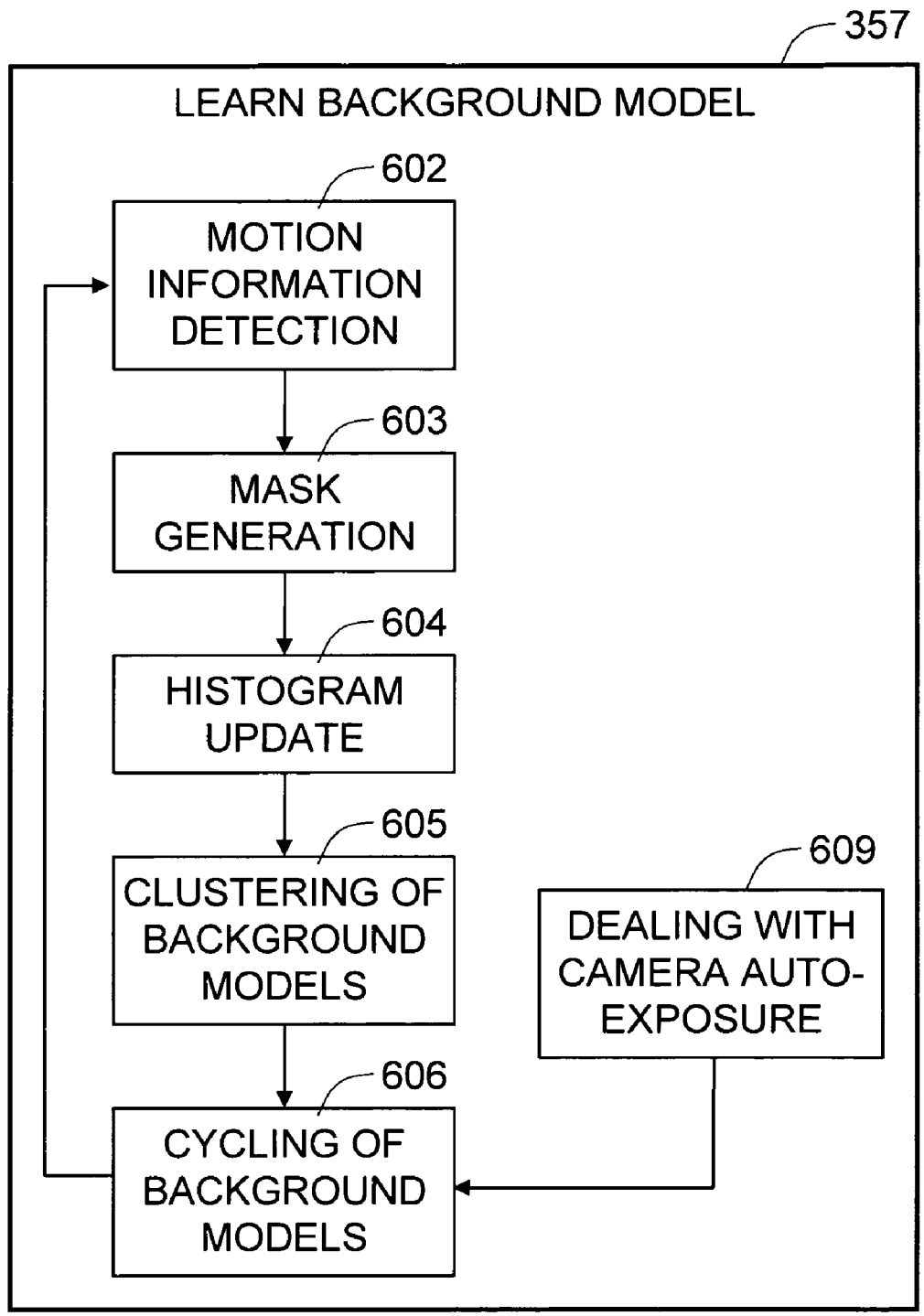
FIG. 11 shows the detailed steps of the background segmentation method in the present invention.

FIG. 11 shows the details of the background segmentation method in the present invention, which comprise the following steps:
 a) Motion information detection 602,
 b) Mask generation 603,
 c) Histogram update 604,
 d) Clustering background models 605, and
 e) Cycling background models 606.

Motion Information Detection

The performance of the image segmentation largely depends on the quality of the sample pixels chosen to represent the background. If the samples are of undesirable quality (i.e., they belong to people or other non-background objects), then the overall segmentation and tracking will suffer. In the exemplary embodiment of the present invention, motion information is used to determine whether or not a pixel should be added to the background pixel samples. Thus, the motion information detection process can help in discarding lower quality background samples. The criterion for the process is that if motion was generated at this pixel within the last T seconds, then this pixel is not added to the sample of background pixels. Additionally, all neighboring pixels within a Manhattan distance of D are also excluded from the background pixel sample. In the exemplary embodiment, the motion information detection process can be implemented by frame differencing technology.

The primary benefit from using motion information is that it enables us to track in regions where a large number of individuals spend significant amounts of time standing around (especially in queue regions). Previously, if a person would be standing at a cash register 60% of the time, that person would be incorrectly learned into the background model. As a result, errors would be introduced into the tracks and the overall system accuracy would suffer. However, using the motion information, this can be avoided. In the present invention, past motion information is used to determine when part of the background is stable and should, therefore, be updated.

With regard to using motion information, in a prior art, Khosravi breaks down the image into a series of subregions in their multi-resolution adaptation system. Each subregion is then broken down yet again into smaller regions, through several iterations. Analysis is then performed on each of the subregions to determine how the background learner processes the scene.

However, the method in the present invention simply sub-samples the entire image, effectively treating each pixel in the subsampled image as a region. At each frame for each pixel a decision is made whether or not the pixel should be added to the samples of the background pixels that are later used to learn background. The decision is determined by the past motion information of each pixel and its nearby pixels within the predefined T seconds.

The mask generation 603 process sets up the region where the background update should happen. One of the advantages of this process is to enhance the processing time by limiting the processed region. Based on the mask, the present invention updates 604 the histogram.

Then, the present invention clusters 605 the histogram according to the predefined time interval. The present invention also cycles 606 the background models, according to the predefined time interval for cycling the background models.

In the exemplary embodiment, the clustering is based on the gray histogram, using two pairs of thresholds, called "Histogram Clustering Threshold." The histogram clustering threshold is applied iteratively, growing the clustered background candidate.

Dealing With Camera Auto-Exposure

In parallel to these main steps, the present invention also deals with camera auto-exposure 609 as an independent process, which takes care of sudden changes in the field of view due to light variation. At this step, the present invention detects the changes in the mean intensity and amount of foreground segmentation, and then resets the background model based on the detected changes.

Dealing with camera auto-exposure is necessary to reduce the amount of segmentation-related errors that arise from the sudden change in pixel intensity. There are two methods that the present invention has used in the past for dealing with auto-exposure.

This method is modeled after the supposed workings of camera hardware regarding auto-exposure. In a grayscale image, the mean intensity value is computed. Sudden and dramatic changes in the mean intensity value generally indicate that the camera exposure settings are about to change. The present invention also computes the mean intensity for specific regions, e.g., the middle 20% of the pixels in the image.

The present invention compares the detected amount of foreground segmentation to a predefined threshold. For example, it is extremely unlikely that the present invention will ever have enough people inside a camera view to cause 80% of the image to be classified as foreground. When the camera exposure levels change, it is very common for more than 80% of the image to be incorrectly classified as foreground. Whenever the threshold is exceeded, the present invention assumes that the camera exposure settings have changed.

When an exposure event is detected, the present invention resets the background model to reduce the errors generated by the video stream due to the background model not matching the new intensity levels.

Dealing with auto-exposure events in software provides two key benefits:

1) It increases the overall accuracy and system performance by reducing noise, and 2) It allows for a wider range of image sensor hardware to be used. In effect, the hardware requirements for the sensors can be relaxed, allowing for the more cost effective sensors to be used.

FIG. 12 shows an exemplary "minimum and maximum thresholds for the intensity histogram" 610 in the two-cluster model and an exemplary table for cycling background models in the exemplary embodiment of the present invention. As the exemplary "table for cycling background models" 607 in FIG. 12 shows, the exemplary embodiment of the present invention can use 5 minutes as the interval for cycling background models. In a particular embodiment, the background is learned over the predefined time interval. Once learned, it replaces the current background model, and the process repeats itself ad infinitum.

Figure 13:
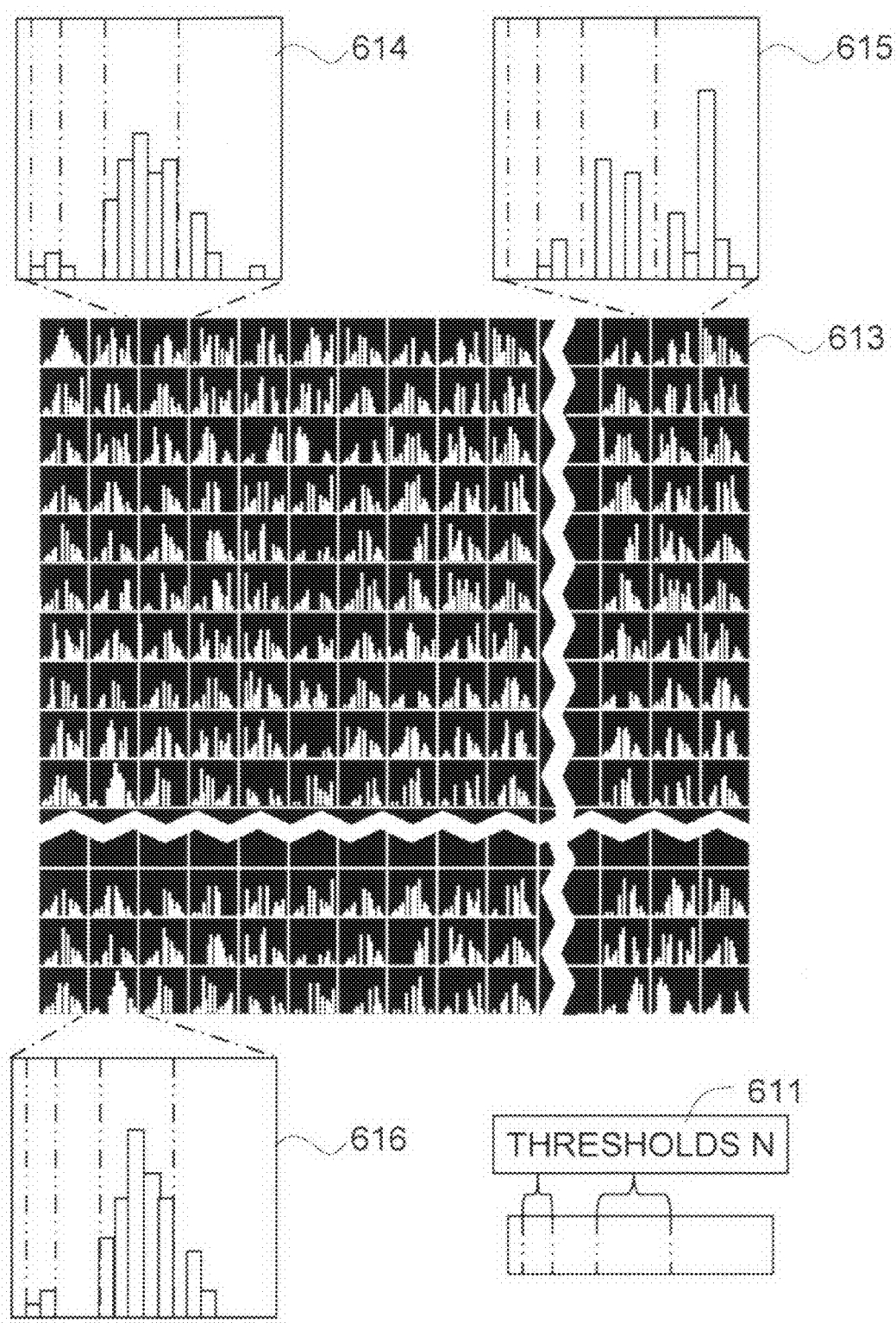
FIG. 13 shows exemplary pixel histograms in the exemplary embodiment of the present invention.

FIG. 13 shows exemplary pixel histograms in the exemplary embodiment of the present invention.

Performing Background Subtraction

The present invention creates an intensity histogram 613 per pixel for the input image, and clusters it into at most two clusters, using two pairs of "minimum and maximum thresholds for the intensity histogram" 610 as shown in FIG. 12. Anything falling outside of these clusters is considered to be foreground. For example, by applying the exemplary "minimum and maximum thresholds N" 611 to the "intensity histogram for pixel A" 614, "intensity histogram for pixel B" 615, and "intensity histogram for pixel N" 616, the pixel A and pixel N can be defined as the background pixels while the pixel B is defined as the foreground pixel.

The two-cluster method is used to both simplify the implementation and to improve the CPU performance. Each cluster possesses a minimum and a maximum threshold that defines the cluster within the range [0.255]. The two clusters (and corresponding 4 thresholds) can be easily represented as one 4-byte word for faster segmentation processing, as shown in the exemplary "minimum and maximum thresholds for the intensity histogram" 610 in FIG. 12.

An exemplary background segmentation method can be found in Stauffer. However, the background segmentation method in the exemplary embodiment of the present invention differs from Stauffer, in that:

1) The method in the present invention is not continuously adaptive. The method in the present invention learns the background over discrete time intervals, and utilizes the learned background for discrete time intervals. The advantage of the approach in the present invention is that the approach has more direct control over when the background model is updated.

2) Another novel approach is that the present invention does not assume a Gaussian shape. The pixel intensity histogram may be clustered into any shape, including a Gaussian. The method in the present invention is able to model backgrounds that do not necessarily correspond to Gaussian distributions. The advantage of the clustering approach in the exemplary embodiment is more robustness compared to the adaptive methods, and it is also more efficient than evaluating a Gaussian.

As noted earlier, both methods by Sun and the present invention group similar pixel values into clusters. However, the present invention uses grayscale instead of RGB or YUV. This allows for faster computation. In addition, the histogram clustering threshold in the present invention is used only to determine the potential width of each pixel cluster. It is not used to determine the total number of clusters. In this case, the present invention fixes the maximum number of clusters at 2. One significant advantage of the method in the present invention is that the segmentation process can be performed more rapidly with only two clusters.

Both methods by Sun and the present invention find prototype vectors, and use them to begin an iterative process that concludes with the generation of multiple clusters. However, the clustering method in the present invention does not attempt to detect dramatic scene changes. The present invention assumes that the camera is fixed, and does not worry about this problem.

The details of the two weighting schemes between Sun and the present invention also differ. Particularly, the present invention generates histograms over a discrete time interval, and then generates clusters from this time interval based on the previously gathered data. Sun builds its cluster information on the fly, rather than all at once.

Relearning the Background

This section describes the method used to determine if the background in a scene should be relearned. In many video scenes, large objects such as ladders are commonly moved within the view of the camera. Previously, the blobs generated by these objects were tracked indefinitely and frequently triggered erroneous events. The purpose of relearning the background in the present invention is to detect when such an object has been moved into the scene, and to treat the pixels composing the objects as background, not foreground, pixels.

The basic approach is to determine which pixels have been classified as foreground pixels for long periods of time. If there are too many of these pixels, then the likelihood that the background should be relearned is high.

The algorithm proceeds as follows:
t=the interval the algorithm is run at
i=inert time threshold
β=blob count threshold
$\alpha_{x,y}$=age of the pixel at position x,y
area(x,y)=area of estimated blob size for pixel at (x,y)

$$f(x, y) = \begin{cases} 0 & a_{x,y} < i \\ \frac{1}{\text{area}(x, y)} & a_{x,y} \geq i \end{cases}$$

1) Set β=0, set $\alpha_{x,y}$=0∀x,y
2) For each x,y:
If the pixel at (x,y) is foreground, then increment $\alpha_{x,y}$ by t, otherwise set $\alpha_{x,y}$=0
3) If $$\sum^{x,y} f(x, y) \geq \beta,$$

then relearn the background.

t, i, and β can be specified with the predefined values.

Figure 14:
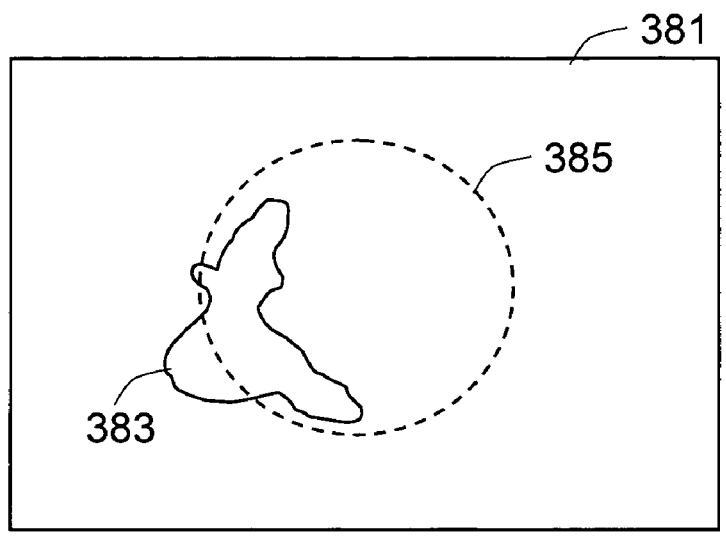
FIG. 14 shows an exemplary match process between a blob of foreground pixels with a template representing the size and shape of a person at a given location in a preferred embodiment of the invention.
Figure 14:
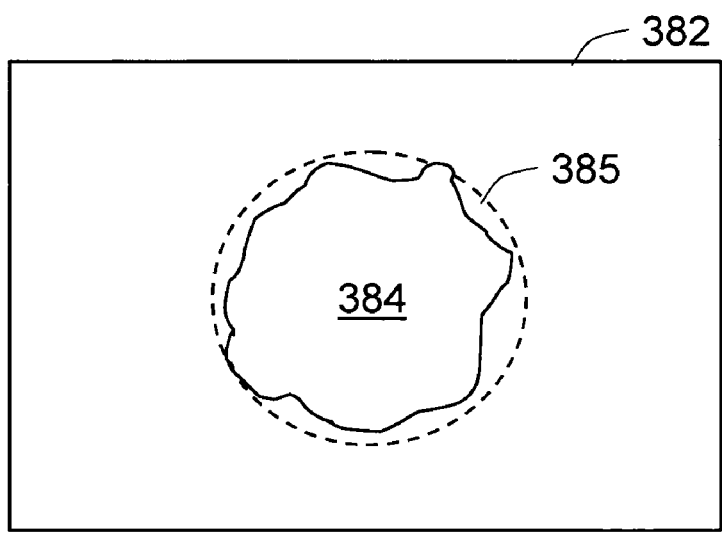

FIG. 14 shows an exemplary match process between a blob of foreground pixels with a template representing the size and shape of a person at a given location in a preferred embodiment of the invention.

In "person template matching 1" 381 shown in FIG. 14, the "foreground segmentation blob 1" 383 (solid black line) does not match the person template 385 (dotted line) at this location. There is a low probability that a person exists at this location. However, in "person template matching 2" 382 shown in FIG. 14, the "foreground segmentation blob 2" 384 very closely matches the person template 385 at this location. Therefore, there is a high probability that a person exists at this location.

Likewise, each "blob" of foreground pixels is matched to a template representing the size and shape of a person at a given location, as illustrated in the exemplary process shown in FIG. 14. By comparing the person templates to areas with segmentation in the image, the probability that a person is standing at a specific location can now be computed. Threshold is then used to filter out low-probability person matches.

Figure 15:
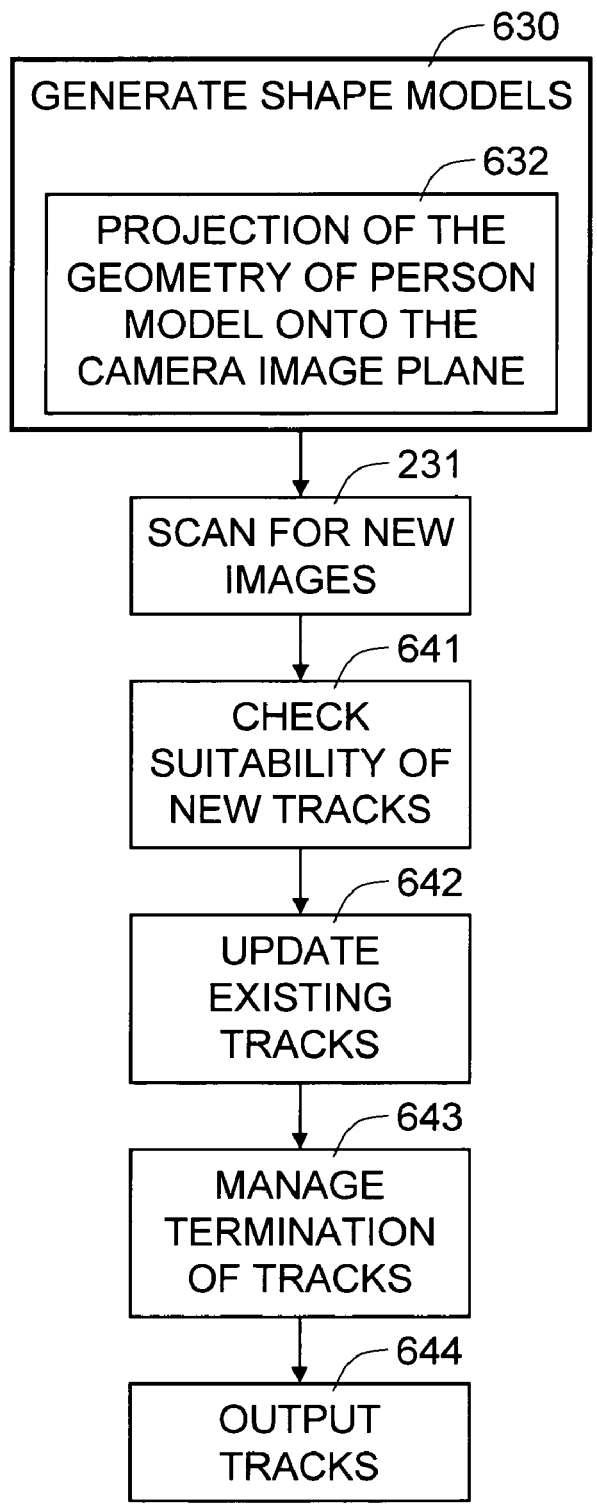
FIG. 15 shows exemplary blob tracking processes in the exemplary embodiment of the present invention.

FIG. 15 shows an exemplary blob tracking processes in the exemplary embodiment of the present invention.

The blob tracking in the exemplary embodiment of the present invention comprises the following sub-steps:
a) Generate shape models 630 by projecting the geometry of the person model onto the camera image plane 632,
b) Scan for new images 231,
c) Check suitability of new tracks 641,
d) Update existing tracks 642,
e) Manage termination of tracks 643, and
f) Output tracks 644.

The present invention generates shape models by projecting the geometry of the person model onto the camera image plane 632. The shape models are used to filter the image. Distortion is modeled via a polynomial transform. At this point, the present invention has a modified image that the present invention will use to track.

The present invention scans through the image, searching for high-intensity pixels. Basically, these pixels represent a probability distribution describing the possibility a person exists at this position. If a threshold is reached, the present invention "erases out" the segmentation where a person is located, then the present invention re-filters the image and repeats until no more people are detected.

New tracks will not be located within a certain distance of preexisting tracks.

The present invention uses the condensation method on what is similar to a mean shift tracker. The present invention generates hundreds of particle via condensation that represents potential track positions. Each particle is scored based on a variety of factors and weights. The condensation algorithm is well known in the field of computer vision, and the details of the condensation algorithm are described in M. Isard, et al. (hereinafter Isard), "Condensation—conditional density propagation for visual tracking," International Journal of Computer Vision 29(1), pp. 5-28, 1998.

The present invention uses weights, where each weight contributes 50% to the condensation score. Based on the mask-filtered image, each pixel represents the probability that a person is standing at its location. The tracker prevents tracks from converging by coordinating the positions of all of the tracks. Each track will have a "preferred position" toward which it will be drawn. The closer a track is to its preferred position, the higher its score. The scores range from 0 (several person distances away) to 1 (the positions match), and are incremented linearly based on the Euclidian distance.

The preferred position is generated by a momentum vector and repulsion vector. The momentum vector is generated representing the current track's movement over the last 1 or 2 seconds. The momentum vector is simply (Pos(t)−Pos1(t−2)) in the present invention. With regard to the repulsion vector, every track within one or two person sizes will generate a repulsive force vector on each track. The magnitude of the vector linearly depends on the Euclidian distance between the two tracks. When there are more than two tracks in proximity, the repulsion vectors will be summed together. These two vectors are averaged to get the final preferred position.

There are two stages for each particle, i.e., prediction and evaluation. For the evaluation stage, the present invention looks at the quality of segmentation (whether the track position matches the segmentation position), past motion information, and proximity to other existing tracks.

To prevent multiple tracks from converging to the same point, overlapping tracks are terminated. Individual camera scene tracks are output to a file on the local computer and are sent to a central database.

Figure 16:
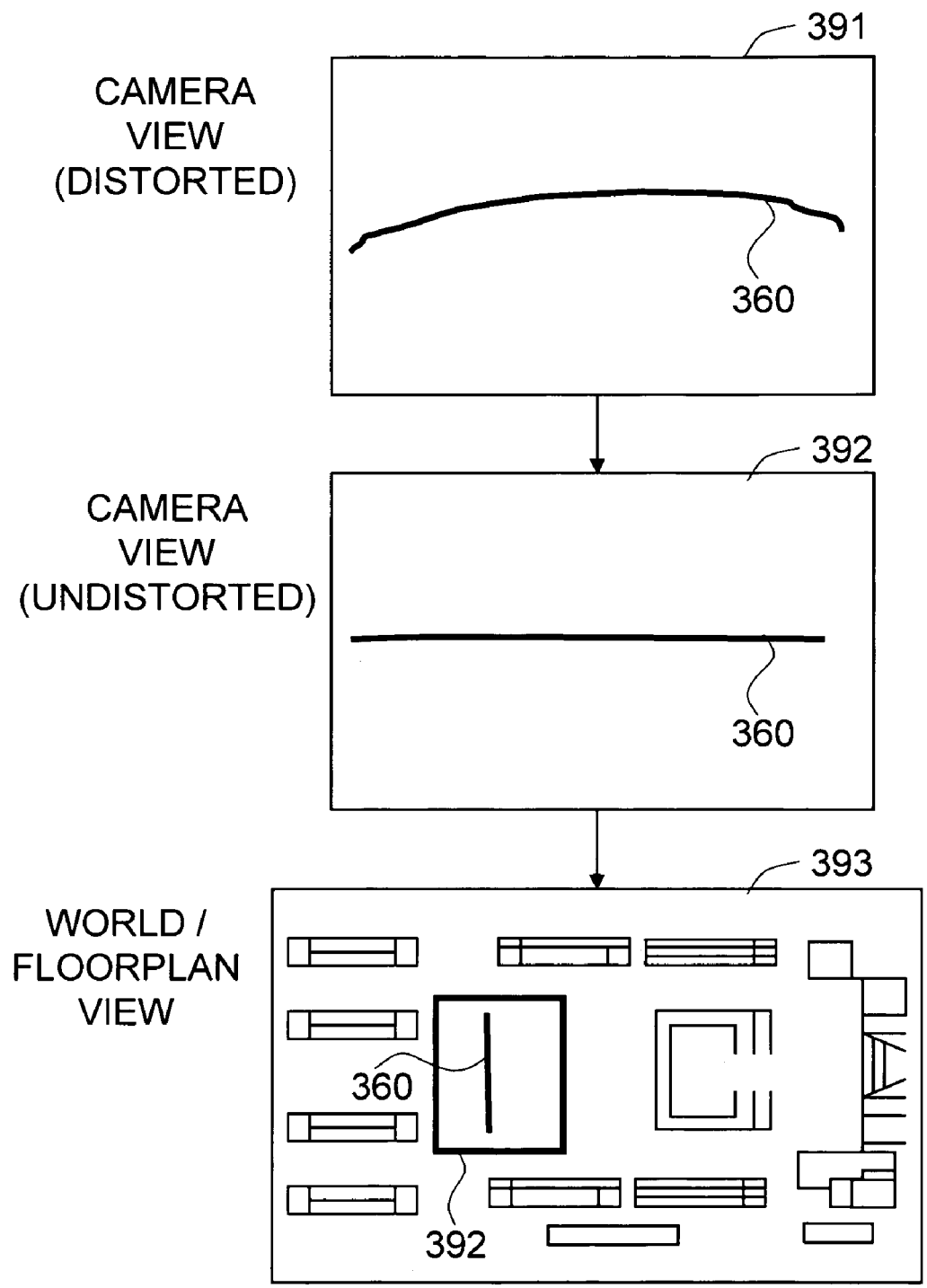
FIG. 16 shows an exemplary process of correcting the tracks to account for camera and lens-specific distortion in a preferred embodiment of the invention.

FIG. 16 shows an exemplary process of correcting the tracks to account for camera and lens-specific distortion in a preferred embodiment of the invention.

Person Tracking within a Camera View

In the exemplary embodiment, person tracking 360 within a camera view can be performed by the Continuously Adaptive Mean Shift (Camshift) algorithm. Tracks are created in regions where people were previously detected. The color histogram surrounding the track's location is computed and then used to generate a probability distribution. The peak (mode) of this distribution is then located from frame-to-frame by an adapted version of the Mean Shift algorithm. The Mean Shift algorithm can be found in the prior art by G. R. Bradski, "Computer video face tracking for use in a perceptual user interface," Intel Technology Journal, Q2, 1998.

Given a probability density image, the exemplary embodiment can find the mean of the distribution by iterating in the direction of maximum increase in probability density. At each frame, the position is recorded and combined with past location information to generate a valid track.

Multi-Camera Tracking

There are 3 key components to the multi-camera tracking system that the exemplary embodiment is concerned with, which are as follows:

1) correct camera-specific distortion,
2) geometric projection of the tracks from local camera coordinates to a world coordinate system, and
3) finding track correspondences between multiple camera views and joining them.

Prior to projecting the tracks onto the floor plan 393, the tracks themselves must be corrected to account for camera/lens-specific distortion. Generally, the image that is being processed suffers from either fish-eye or barrel distortion due to the bending of light as it passes through a camera lens, as illustrated by the person tracking 360 in the camera view (with distorted tracking) 391. This distortion is modeled by a polynomial, using its degree and coefficients as input parameters specific to each camera/lens combination. The polynomial itself defines the transformation of a point x from the distorted coordinate space to a point P(x) that represents how the point would appear if there were no camera distortion. Each track is then undistorted to allow for more accurate geometric projection, as illustrated by the person tracking 360 in the camera view (with undistorted tracking) 392.

Projecting the local camera tracks, a plurality of the person tracking 360 in the camera view (with undistorted tracking) 392 onto the floor plan 393 is performed by deriving a homography matrix based on point correspondences. A series of point correspondences are marked between the local camera view and the world coordinate view, which in this case is the store's floor plan 393. The relationship between the corresponding sets of points in the two images is used to define a homography matrix. This homography matrix can be used to transform points (and ultimately person tracks) from one coordinate system to another.

Correspondences between tracks across a plurality of means for capturing images 100 are found by using the method discussed by F. Porikli, "Multi-Camera Surveillance: Object-Based Summarization Approach," MERL, March 2004. In the exemplary embodiment, Bayesian Belief Networks can be used to establish the correspondences. This method is based on the strong correlation between camera system geometry and the likelihood of the objects appearing in a certain camera view after they exit from another one.

Figure 17:
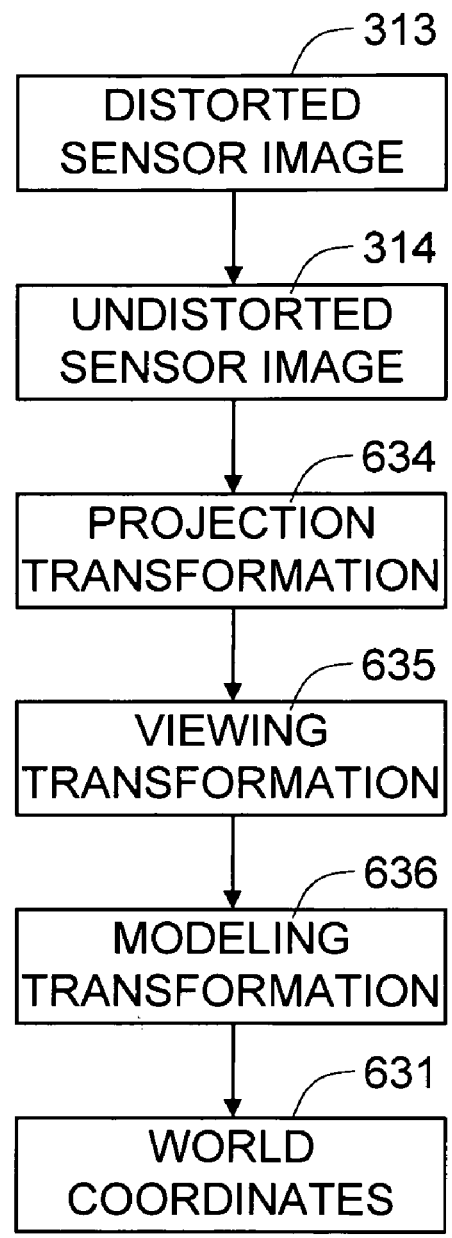
FIG. 17 shows an exemplary transformation from pixel coordinates into world coordinates, including the un-distortion process of the image to correct for image distortion resulting from light bending in the exemplary embodiment of the present invention.

FIG. 17 shows an exemplary transformation from pixel coordinates into world coordinates, including the un-distortion process of the image to correct for image distortion resulting from light bending in the exemplary embodiment of the present invention.

Generation of Shape Models

In the particular embodiment of the present invention, the shape models can be fixed size and do not adapt to target size in the image.

The shape models are generated in the following manner:

For each pixel in the image frame, the present invention generates a corresponding mask representing the expected size and shape of an individual if the person's feet were located at this position. First, the present invention uses sensor-specific information to transform these pixel coordinates into world coordinates in meters (focal length, lens distortion parameters, camera height). The steps to this transformation are similar to a typical rendering pipeline performed in reverse, as shown in FIG. 17:

Step 2 in 314 differs from a standard reverse rendering pipeline transform. It is necessary to un-distort the image to correct for image distortion resulting from light bending as it passes through the camera lens.

Distortion correction enables us to utilize wide-angle lenses. Using wide-angle lenses means that fewer cameras are required to cover the entire floor plan. As a result, the overall installation and maintenance costs can be decreased significantly.

For example, errors introduced by distortion from a 36 mm lens are fairly insignificant, so distortion correction would not be required. A 2.1 mm lens possesses noticeable barrel distortion—individuals tracked near the edges of the camera scene could have the tracks projected into world coordinates with errors of several feet or more. It is difficult to easily correct for errors this large.

The lens distortion correction technique can use a well-known polynomial distortion technique, which is widely used in the photography industry. F. Devernay, et al. (hereinafter Devernay), "Straight lines have to be straight," Automatic calibration and removal of distortion from scenes of structured environments, Machine Vision and Applications, 13(1), pp. 14-24, 2001 shows an exemplary usage of the technique. The present invention can also utilize the technique to simply find the parameters for the camera lenses used in a particular embodiment of the invention. The method in the present invention requires a human to manually find the polynomial coefficients, while the method in Devernay does so automatically.

For each lens, the present invention manually pre-computes the coefficients to a 7th degree polynomial. The resulting polynomial is used to find the new radius in the undistorted image:

$$P(distortedR) = undistortedR$$

Where distortedR is the radius of pixel in polar coordinates in the original distorted camera image, and undistortedR is the radius of pixel in polar coordinates in the corrected image.

Once the present invention has the world coordinates matching this pixel, a closed 3D cylinder is drawn in the world coordinate system at this place. The previously mentioned transformation pipeline is then reversed, resulting in an image containing only a distorted white cylinder. The distorted white cylinder then becomes the mask used to represent a person standing at that specific pixel coordinate.

Once the present invention has the masks, the probability that a person is standing at each pixel can be computed by comparing the mask to the available foreground segmentation. Tracking is performed on this image.

Although Crabtree U.S. Pat. No. 6,263,088 disclosed the camera calibration data section, it differs from the present invention in that, as input, Crabtree U.S. Pat. No. 6,263,088 accepts information regarding the statistical range of person width/heights. The model information generated is with respect to the pixel location of the foot, just like that of the present invention.

In addition, the method in the present invention differs from Crabtree U.S. Pat. No. 6,263,088 in that the present invention does not require three key pieces of information: a) statistical information about the range of valid person heights, b) statistical information about the range of valid person widths, and c) statistical information about the range of ratios of valid person heights to valid person widths. The method in the present invention only requires a) person position, b) average person height, and c) average person width.

Figure 18:
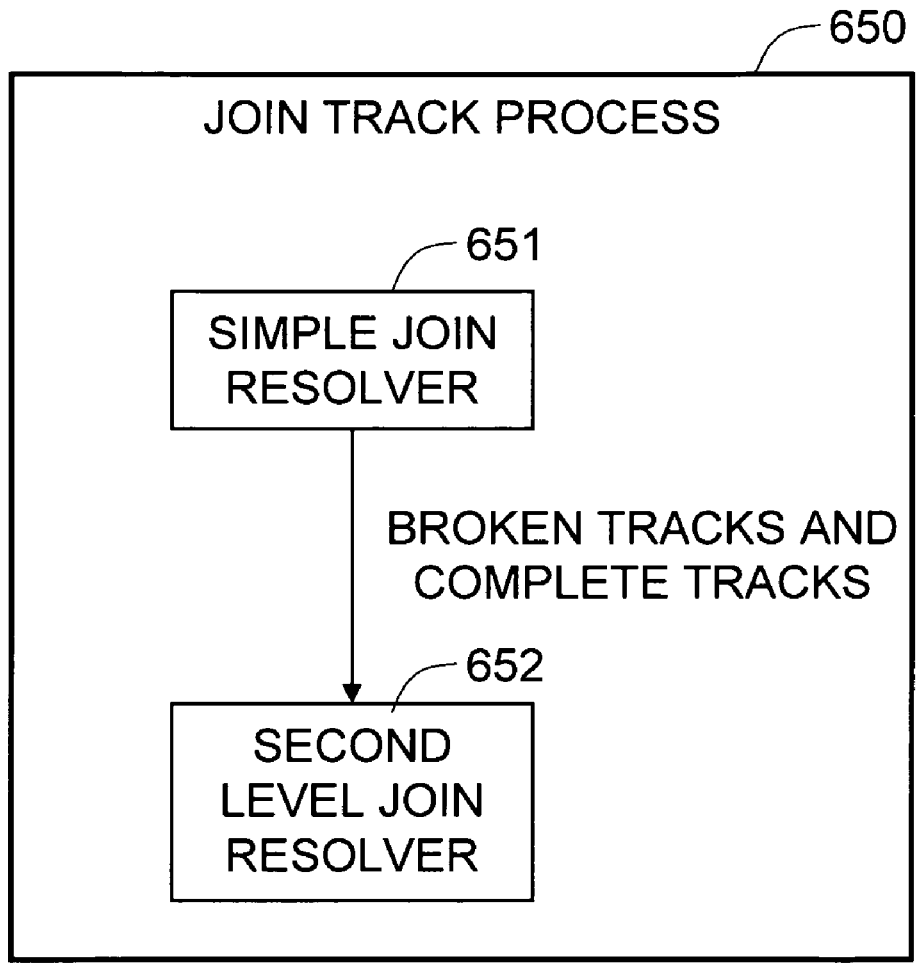
FIG. 18 shows an exemplary join process in an embodiment of the present invention.
Figure 19:
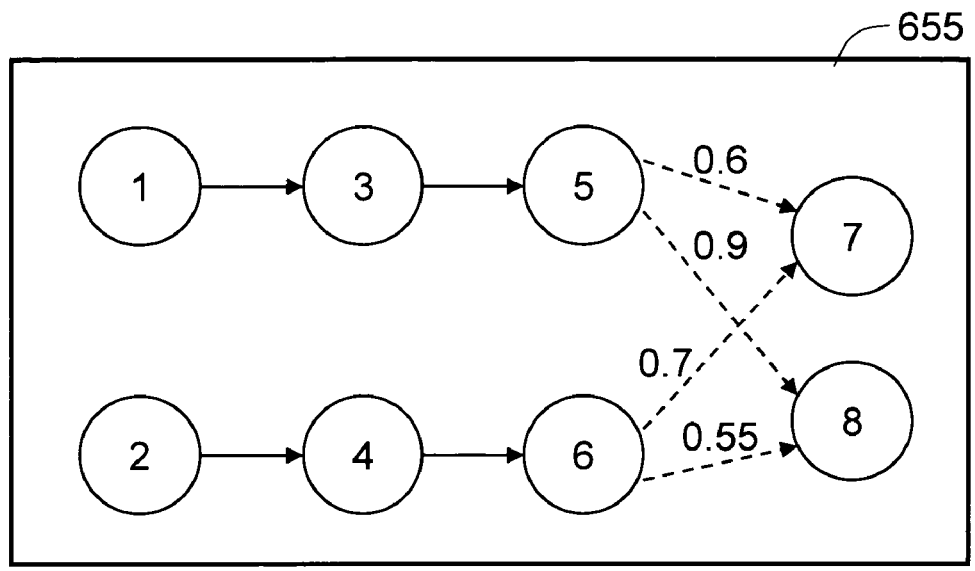
FIG. 19 shows exemplary node graphs in the embodiment of the join process.
Figure 19:
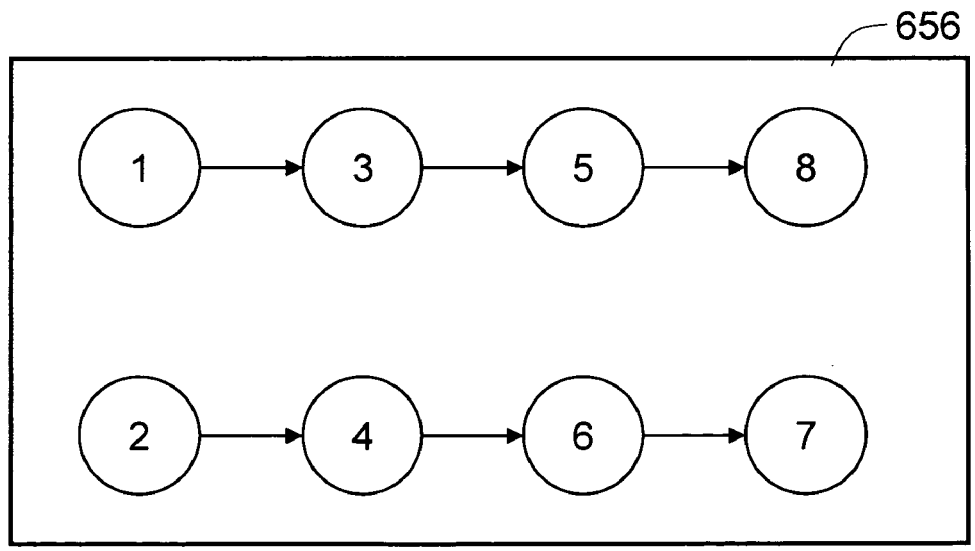

FIG. 18 shows an exemplary join process in an embodiment of the present invention. FIG. 19 shows exemplary node graphs in the embodiment of the join process. In the embodiment of the present invention, the join is a 2-step process, comprising Simple Join Resolver (SJR) and Second-Level Join Resolver (SLJR). The first level module solves the obvious joins, while the second level module solves the more complex joins in case of merge splits and lost tracks.

In order to join the tracks together, each camera has calibration information generated by a human and, based on the calibration parameters, tracks are transformed from camera view coordinates to world coordinates (in meters).

Simple Join Resolver

The present invention detects incomplete and broken tracks and filters them out to get a subset of the more reliable complete tracks. A graph is created treating each track as a node, and an edge between the two is formed if it satisfies a set of predefined spatiotemporal rules, such as distance, time, and speed constraints. For example, if the spatial distance and temporal difference of two track segments are within predefined thresholds, an edge can be formed. In another example, if the beginning and end of two track segments are within a predefined spatial region, they can also be considered for a join.

An edge between two nodes represents the possibility that the two tracks belong to the person in the sequence. In the "node graph before resolution" 655, shown in FIG. 19, each node represents a track returned from the single camera tracker. The solid arrow represents the resolved handover, whereas the dashed line represents unresolved join. The number above each dashed line represents the score between the two.

The distance may not be the shortest distance between the points if blocking objects, such as furniture, exist between them. Incorporating the constraints of the blocking objects, such as the furniture, is discussed below. Based on the different distance, time, and speed constraints, a score is assigned to the edges, which represents the value of the edges.

Once all of the possible edges have been formed, the constraint allowing only one edge to and from the node is applied. Thus, only the edges with the highest score are kept. In FIG. 19, the SJR keeps the edge from node 5 to node 8 and the edge from node 6 to node 7, since the two have the highest scores among the edges. The "node graph after resolution" 655 in FIG. 19 shows the output result.

Second-Level Join Resolver

The input of the second level join resolver is passed as input to this module. It analyses the longer track list to see if they are complete (starting and ending at the defined region points) and filters them out. Only the broken tracks are used to analyze and complete them.

The method is similar to the simple join resolver except this allows merge-splits and tracks lost in non-covered regions.

Block Object (Furniture) Constraint Generator

The physical difference between the two nodes without blocking objects along the aisle is the straight-line distance between two points, whereas the actual physical difference between the two nodes with blocking objects, such as across the furniture, is the distance from the one point to walk around the blocking object, furniture, to get to the other point. By marking the furniture and performing a path search can allow us to compute the actual shortest distances regardless of whether the two points are along a single aisle or the opposite sides of the furniture in the exemplary embodiment.

1) Graph Formation

In the exemplary embodiment, the present invention resizes the matrix so that new height and width are scaled by the grid size. Then the present invention forms a graph where each grid is a node.

For adding edges, the present invention can use the following rules:

Add an edge from grid1 to grid2 if grid1 and grid 2 are neighbors and grid 1 and grid 2 are not furniture pixels.

If grid 1 has furniture and grid 2 does not have furniture, there is an edge from grid 2 to grid 1.

If grid 1 and grid 2 are both furniture grids, add an edge from grid 1 to grid 2 only if grid 1 has no non-furniture grid neighbors.

The last case is not necessary but will be needed if a certain track falls on some furniture because of errors.

2) Calculating all-Pairs Shortest Path Algorithms

The Djikstra's search method can be used to find the shortest path to grids within a predefined window surrounding the current node.

3) Compressing all Pairs Shortest Distance Output

Since the entire matrix is huge, printing it would be infeasible. So to compress the data, only those grid pair distances (which is the path length) that are a predefined percent higher than the shortest distance (straight line distances) between the grid pairs are printed. In addition, grid pairs whose shortest distances exceed a predefined threshold need not be outputted. Outputting such pairs will lead to a lot of space savings. For example, in the worst cast scenario, a 1200×800 with a 20×20 grid size will require 240,000 units if only grid pairs whose shortest distances are 5 grid units are included. This excludes the compression obtained from not including the grid pairs whose straight-line distances are not that much different from the path length.

The present invention can also utilize a rule application module in Jung 60/874,585 for joining the tracks. Utilizing the module, the present invention can dynamically set the rules and change the way in which the joins are performed based on the layout of the objects in the physical space.

While the above description contains much specificity, these should not be construed as limitations on the scope of the invention, but as exemplifications of the presently preferred embodiments thereof. Many other ramifications and variations are possible within the teachings of the invention. Thus, the scope of the invention should be determined by the appended claims and their legal equivalents, and not by the examples given.

What is claimed is:

1. A method for automatically determining the trip of a person in a physical space, comprising the following steps of:
   a) capturing a plurality of input images of said person by a plurality of means for capturing images,
   b) performing background subtraction applying a two-cluster model to a grayscale intensity histogram per pixel,
   c) processing said plurality of input images in order to track said person in each field of view of said plurality of means for capturing images,
   d) mapping the trip on to the coordinates of the physical space,
   e) joining a plurality of tracks across the multiple fields of view, and
   f) finding information for said trip of said person based on the processed results from the plurality of tracks,
   wherein the two-cluster model consists of two pairs of thresholds that are represented in one 4-byte word.

2. The method according to claim 1, wherein the method further comprises steps of:
   a) tracking said person in a first field of view of a first means for capturing images among the plurality of means for capturing images,
   b) tracking said person in a second field of view of a second means for capturing images among the plurality of means for capturing images when said person moves from the first field of view to the second field of view, and
   c) aggregating the plurality of tracks in the first field of view and the second field of view,
   wherein the results of the aggregated tracks provide a series of coordinates and temporal attribute for said trip of said person.

3. The method according to claim 1, wherein the method further comprises a step of utilizing the trip information to provide key measurements along the entire trip, from entrance to exit, that deliver deeper insights about the trip as a whole.

4. The method according to claim 1, wherein the method further comprises a step of extracting analytical and statistical data from said trip information.

5. The method according to claim 1, wherein the method further comprises a step of detecting incomplete and broken tracks and filtering them out to get a subset of the more reliable complete tracks.

6. The method according to claim 1, wherein the method further comprises a step of differentiating said person from the background by analyzing past motion information to generate a background model for each pixel in each of said plurality of means for capturing images,
   wherein said background model is a non-Gaussian cluster of pixel intensities.

7. The method according to claim 1, wherein the method further comprises a step of computing changes in mean intensity and amount of foreground segmentation of the input images, and then resetting a background model based on the changes.

8. The method according to claim 1, wherein the method further comprises a step of applying calibration information of said plurality of means for capturing images to transform each local track in said plurality of means for capturing images into a global coordinate space.

9. The method according to claim 1, wherein the method further comprises a step of detecting the existence of said person at each pixel level in the images for each video stream.

10. The method according to claim 1, wherein the method further comprises a step of detecting the existence of said person using a model-based approach.

11. The method according to claim 10, wherein the method further comprises a step of modeling both the means for capturing images and the dimensions of an average-sized person.

12. The method according to claim 1, wherein the method further comprises a step of utilizing a rule application module for processing the group behavior analysis and joining the tracks,
   whereby the rule application module comprises information unit verification technologies.

13. An apparatus for automatically determining the trip of a person in a physical space, comprising:
   a) a plurality of means for capturing images that captures a plurality of input images of said person,
   b) means for control and processing that performs the following steps of:
   performing background subtraction applying a two-cluster model to a grayscale intensity histogram per pixel,
   processing said plurality of input images in order to track said person in each field of view of said plurality of means for capturing images,
   mapping the trip on to the coordinates of the physical space,
   joining a plurality of tracks across the multiple fields of view, and
   finding information for said trip of said person based on the processed results from the plurality of tracks,
   wherein the two-cluster model consists of two pairs of thresholds that are represented in one 4-byte word.

14. The apparatus according to claim 13, wherein the apparatus further comprises a computer that performs the following steps of:
   a) tracking said person in a first field of view of a first means for capturing images among the plurality of means for capturing images,
   b) tracking said person in a second field of view of a second means for capturing images among the plurality of means for capturing images when said person moves from the first field of view to the second field of view, and
   c) aggregating the plurality of tracks in the first field of view and the second field of view,
   wherein the results of the aggregated tracks provide a series of coordinates and temporal attributes for said trip of said person.

15. The apparatus according to claim 13, wherein the apparatus further comprises a computer for utilizing the trip information to provide key measurements along the entire trip, from entrance to exit, that deliver deeper insights about the trip as a whole.

16. The apparatus according to claim 13, wherein the apparatus further comprises a computer for extracting analytical and statistical data from said trip information.

17. The apparatus according to claim 13, wherein the apparatus further comprises a computer for detecting incomplete and broken tracks and filtering them out to get a subset of the more reliable complete tracks.

18. The apparatus according to claim 13, wherein the apparatus further comprises a computer for differentiating said person from the background by analyzing past motion infor mation to generate a background model for each pixel in each of said plurality of means for capturing images,
wherein said background model is a non-Gaussian cluster of pixel intensities.

19. The apparatus according to claim 13, wherein the apparatus further comprises a computer for computing changes in mean intensity and amount of foreground segmentation of the input images, and then resetting a background model based on the changes.

20. The apparatus according to claim 13, wherein the apparatus further comprises a computer for applying calibration information of said plurality of means for capturing images to transform each local track in said plurality of means for capturing images into a global coordinate space.

21. The apparatus according to claim 13, wherein the apparatus further comprises a computer for detecting the existence of said person at each pixel level in the images for each video stream.

22. The apparatus according to claim 13, wherein the apparatus further comprises a computer for detecting the existence of said person using a model-based approach.

23. The apparatus according to claim 22, wherein the apparatus further comprises a computer for modeling both the means for capturing images and the dimensions of an average-sized person.

24. The apparatus according to claim 13, wherein the apparatus further comprises a computer for utilizing a rule application module for processing the group behavior analysis and joining the tracks,
whereby the rule application module comprises information unit verification technologies.

* * * * *